(12) United States Patent
Sinha et al.

(10) Patent No.: US 7,392,509 B2
(45) Date of Patent: Jun. 24, 2008

(54) METHOD FOR DOMAIN SPECIFIC TEST DESIGN AUTOMATION

(75) Inventors: Avik Sinha, Greenbelt, MD (US); Carol S. Smidts, Bethesda, MD (US)

(73) Assignee: University of Maryland, College Park, MD (US)

( * ) Notice: Subject to any disclaimer, the term of this patent is extended or adjusted under 35 U.S.C. 154(b) by 722 days.

(21) Appl. No.: 10/822,739

(22) Filed: Apr. 13, 2004

(65) Prior Publication Data

US 2005/0240794 A1  Oct. 27, 2005

(51) Int. Cl.
  *G06F 9/44*  (2006.01)
(52) U.S. Cl. .................. 717/126; 717/104; 717/136
(58) Field of Classification Search .............. 717/126
  See application file for complete search history.

(56) References Cited

U.S. PATENT DOCUMENTS

| | | | | |
|---|---|---|---|---|
| 5,343,554 | A | * | 8/1994 | Koza et al. ............... 706/13 |
| 5,892,947 | A | * | 4/1999 | DeLong et al. ........... 717/100 |
| 6,289,502 | B1 | * | 9/2001 | Garland et al. ........... 717/104 |
| 6,898,784 | B1 | * | 5/2005 | Kossatchev et al. ...... 717/126 |

OTHER PUBLICATIONS

Enhanced testing of domain specific applications by automatic extraction of axioms from functional specifications Sinha, A.; Smidts, C.S.; Moran, A. Software Reliability Engineering, 2003. ISSRE 2003. 14th International Symposium on, vol., Iss., Nov. 17-20, 2003 pp. 181-190.*

Reyes, A.A.; Richardson, D., "Siddhartha: a method for developing domain-specific test driver generators," Automated Software Engineering, 1999. 14th IEEE International Conference on., vol., No., pp. 81-90, Oct. 1999.*

D. Leijan, et al., "Domain Specific Embedded Compilers", Proceedings of 2nd USENIX Conference on DSL, Austin, Texas, Oct. 1999.

D. Peters, et al., "Using Test Oracles Generated from Program Documentation", IEEE Transactions on Software Engineering, vol. 24, No. 3, pp. 161-173, Mar. 1998.

(Continued)

*Primary Examiner*—Tuan Dam
*Assistant Examiner*—J. Derek Rutten
(74) *Attorney, Agent, or Firm*—Rosenberg, Klein & Lee

(57) ABSTRACT

A method for automatically generating test cases from a domain specific description language specification makes use of the properties of the language to derive domain specific axioms and language specific predicates. These properties are embedded into an extended finite state machine which is in turn supplied to the input of a test case generator. The enhanced extended finite state machine, referred herein as an extended finite state machine accounting for axioms and predicates (EFSMAP) contains states and transitions associated with information on implied behavior of the specified system within a particular problem domain. The implicit behavior, defined by the axiomatic properties of the operators of the domain specific language, provide test capability of the associated system that was not explicitly set forth in the formal specification, but nevertheless should be tested to increase confidence in the reliability of the finished product.

22 Claims, 12 Drawing Sheets

OTHER PUBLICATIONS

P. Stocks, et al., "A Framework for Specification-Based Testing", IEEE Transactions on Software Engineering, vol. 22, No. 11, pp. 777-793, Nov. 1996.

M. Chechik, "Using SCR Requirements", University of Toronto, Department of Computer Science, Oct. 5, 1998.

M. Chechik, "SC(R)3: Towards Usability of Formal Methods", Proceedings of the 1998 Conference of the Centre for Advanced Studies on Collaborative Research, IBM Press, 1998.

L. Jagadeesan, et al., "Specification-based Testing of Reactive Software: Tools and Experiments", Proceedings of the Nineteenth International Conference on Software Engineering, Boston, Massachusetts, pp. 525-535, May 1997.

J. Chang, et al., "Strucutural Specification-Based Testing: Automated Support and Experimental Evaluation", Proceedings of the 7th European Software Engineering Conference held jointly with the 7th ACM SIGSOFT International Symposium on Foundations of Software Engineering, pp. 285-302, 1999.

G. Kotik, et al., "Automating Software Analysis and Testing Using a Program Transformation System", Proceedings of the ACM SIGSOFT '89 third symposium on Software testing, analysis, and verification, pp. 75-84, 1989.

K. Cheng, et al., "Automatic Functional Test Generation Using the Extended Finite State Machine Model", 30th ACM/IEEE Design Automation Conference, pp. 86-91, 1993.

D. Andrews, et al., "An Automated Program Testing Methodology and Its Implementation", IEEE Proceedings of the 5th International Conference on Software Engineering, pp. 254-261, 1981.

S. Kansomkeat, et al., "Automated-Generating Test Case Using UML Statechart Diagrams", Proceedings of SAICSIT 2003, pp. 296-300, 2003.

* cited by examiner

METHOD FOR DOMAIN SPECIFIC TEST DESIGN AUTOMATION

STATEMENT REGARDING FEDERALLY SPONSORED RESEARCH OR DEVELOPMENT

The development of the invention described herein was funded by the U.S. Government through Contract MDA-904-01-C-0968 granted by the Department of Defense. The U.S. Government has certain rights in this invention.

BACKGROUND OF THE INVENTION

1. Field of the Invention

The present invention is related to the automated design of reliability testing. Specifically, the invention is a specification-based test automation technique that captures implicit domain specific properties in system test models automatically by exploiting type-specific axioms of syntactical relationships between morphemes of domain specific system description languages.

2. Description of the Prior Art

Reliability test automation is an effective means by which aggressive product deadlines may be met and by which a quality final computing application may be delivered. However, the automated testing methods that are heretofore available may fail to scrutinize all of the requirements of a specific problem domain associated with the system under development. This is mainly due to the fact that domain specific requirements are not usually specified explicitly. To illustrate, consider the functional specification fragment, "The system must power down if backup power is unavailable." A system modeler may translate the fragment into a description language specification fragment "if (backup!=available) then power:=off". A test case generator may then provide a test script to test the system for the specified requirement, but prior automatic test suites would not automatically test an implicit "else" case, i.e., "if (backup==available) then . . . ". Essential, the lack of the ability to automatically test for the implicit content of a specification leaves a gap in a complete reliability test of a system.

As another example, consider any database application throwing queries to a static database. It is unlikely that there will be an explicit requirement for the application to handle database related errors such as throwing queries for a non-existent field of the database. This null field requirement is nevertheless important to insure proper operation of the application and, hence, such functionality should be tested.

For the past several decades, computing applications in particular have become increasingly sophisticated and feature-rich. As more complex designs are being attempted, the character of software development has changed. As the modest designs of yesteryear give way to more elaborate systems, the greater chance of error exists in implementing the design. Adding to the possibility for error is the fact that the present users of software are not primarily programmers as in times gone by, but are persons of all ages and computer skill levels. Thus, it becomes critical that software be tested not only for functionality according to the design specification, but also for implied functionality, such as handling erroneous user input.

Recently, the application of the extended finite state machine (EFSM) to functional test generation has increased the thoroughness of automated procedures. The EFSM extends the simple finite state machine by adding data variables. The data variables allow transitions from one state to another based on the value associated therewith. The state which follows when a specific input is processed is not just determined by the existing state and input, as is the case with the simple state finite machine. A state transition may also occur in an EFSM in accordance with information passed in signals or through parameters of a function call. Thus, the extended finite state machine is particularly useful in modeling not only certain systems, but also various types of software applications.

In the Journal paper "Automatic Functional Test Generation Using the Extended Finite State Machine Model", by K. Cheng and A. Krishnakumar ($30^{th}$ Proceeding of the ACM/IEEE Design Automation Conference, June 1993), the authors present a method of generating functional vectors for sequential circuits from a high-level description of the circuit in VHDL or C programming language. The method guarantees, according to the authors, that the generated set of vectors cover every statement in the high-level description at least once. Whereas, such generalized syntheses of an EFSM from a high-level specification have produced favorable results, such does not insure that a complete set of properties peculiar to the specific problem domain are included in the model. Thus, some features of the system may be excluded from testing. This is especially true when certain functionality of the system that was not explicitly set forth in the formal specification.

The shortcomings of automated test design discussed above are prevalent in the prior art. In light of these shortcomings and to further advance the technology in the field of automated reliability test design, there exists a need for a method for automatically generating test cases for behaviors of a system operating within a problem domain which are both explicitly set forth in the formal specification and implicit to the formal specification.

SUMMARY OF THE INVENTION

The present invention provides a method for extracting properties of a domain specific system through the use of a domain specific description language specification. By proper choice of the domain specific language, a set of axioms associated therewith may be carried over to the behavioral model of the application. The method of the present invention extracts the axioms automatically from the domain specific language specification to embed additional test paths in the behavioral model, thereby enhancing the test suite to include test cases which were not explicitly set forth in the formal specification.

The method of the present invention may be carried out by first translating a natural language specification of a system operationally particular to at least one specific problem domain to a specification authored in at least one domain specific description language. The description language has associated therewith a set of axioms, each of which corresponds to a syntactical relationship between morphemes of the description language. A model of the system is extracted from the domain specific language specification. The model behaves in accordance with behaviors explicitly specified in the natural language specification and with behaviors corresponding to the axioms of the domain specific language. Test cases are then generated from the behavioral model.

In another aspect of the present invention, the method may be carried out by first providing to a test authority the natural language specification of a computing application. The computing application is specific to a particular computing domain and the natural language specification thereof defines a closed set of behaviors of the application. The natural language specification is then translated into a domain specific language specification and a behavioral model is generated therefrom. The model behaves in accordance with at least one set of axioms peculiar to the domain specific language. The behavioral model is then used to generate a set of test cases which are executed by the computing application. Each of the test cases is executed by the application and those test cases which result in a behavior contrary to that specified in the natural language specification is communicated to the testing authority.

DETAILED DESCRIPTION OF THE PREFERRED EMBODIMENTS

The method of the present invention will be exemplified by way of a database application, i.e., the application is designed to operate specifically in a database computing domain. It is to be understood that the database application includes sufficient complexities to illustrate the present invention and is meant to exemplify, and not to limit, the inventive method. However, prior to describing the exemplary embodiment of the present invention, a general description of various behavioral models implemented by the invention shall be discussed.

Figure 1:
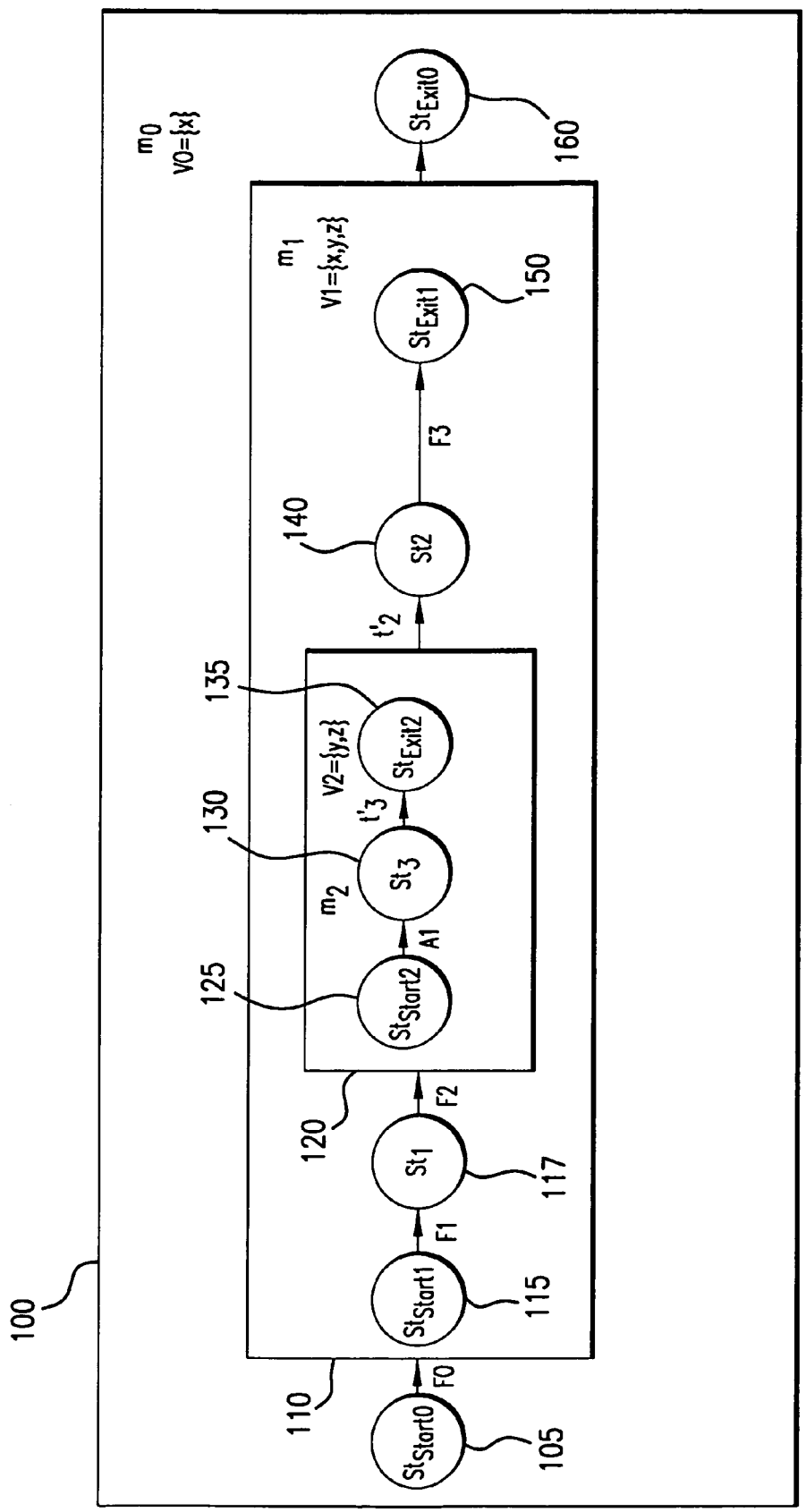
FIG. 1 is a state diagram of an extended finite state machine with embedded variables.

Referring to FIG. 1, there is shown a typical extended finite state machine (EFSM) as might be implemented by the present invention. The EFSM of FIG. 1 models the behavior of the specification S={F0(x){F1(y,x); F2(z,y){A1(y,z)}; F3(x,y);};}, where Fi{Fj} denotes that Fj is called from within Fi. The variables within the parentheses will be treated in paragraphs that follow. For the remainder of the present discussion, the variables will be ignored and the model of FIG. 1 will correspond to the specification $S_0$={F0{F1; F2{A1};F3;};}.

As is shown in FIG. 1, the EFSM consists of an outermost model, m0, indicated at 100. Upon entry to the model $m_0$, the EFSM is set to an initial state, $St_{Start0}$, indicated at 105. The model $m_0$ is exited upon a state transition (as indicated by the directed line segments) to an exit state, $St_{Exit0}$, as shown at 160. Further upon entry, EFSM 100 undergoes a state transition by a function call to F0. As indicated by the specification, F0 calls a group of functions F1, F2 and F3, providing motivation to instantiate a new sub-model $m_1$, as shown at 100.

In like fashion to the outer model $m_0$, sub-model $m_1$ is initialized to a state $St_{Start1}$, as shown at 115, and exits by a state transition to $St_{Exit1}$, as shown at 150. A call to F1 causes the EFSM to transition into a state $St_1$, referenced at 117. At state $St_1$, the EFSM undergoes a state transition by a function call to F2. A1 is called from within F2 and, once again, this motivates the construction of a sub-model $m_2$, referenced at 120, which is initialized to a state $St_{Start2}$, as shown at 125, and exits on transition to $St_{Exit2}$, shown at 135. A call to A1 places the EFSM 100 at state $St_3$, shown at 130, and a transition $t'_3$ places the EFSM at state $St_{Exit2}$, whereupon sub-model $m_2$ is exited. A state transition $t'_2$ places the EFSM at state $St_2$, shown at 140. At state $St_2$, a function call to F3 places the EFSM at state $St_{Exit1}$, whereupon sub-model $m_1$ is exited. The EFSM is then placed at state $St_{Exit0}$, which completes the formulation of the behavior of the specification S.

If the specification S is to set forth the behavior of an application specific to a particular problem domain, e.g., the computing domain to which an exemplary database query engine belongs, the use of a description language, e.g., domain specific programming language to author the specification provides a number of advantages. First, domain specific languages (DSLs) are generally implemented through only a small number of operators. This is due to the fact that only applications peculiar to a specific computing domain are anticipated by the language. A limited number of operators not only facilitates an understanding of the syntax of the language in a short period of time, but also reduces the number of language specific axioms which require modeling.

Additionally, domain specific description languages (including domain specific programming languages) define a set of axioms corresponding to syntactical relationships between the various morphemes (the smallest meaningful units of a language) of the language. Thus, axioms are properties of the language which must be true in order for it to be implemented or carried out. The use of axioms to enhance the behavioral models produced by the present invention will be discussed in paragraphs that follow.

One of the advantages of using a DSL to specify a system belonging to a specific domain is in the ability of the DSL to capture domain specific information. The method of the present invention utilizes this property of the DSL to automatically extract a domain specific behavioral model therefrom. This is possible because the domain specific knowledge of a DSL in a specification is formalized at the appropriate level of abstraction.

Numerous examples of DSL use is observed in many software development processes. An example of a domain specific description language is VHDL. Some domain specific programming languages are widely used worldwide and are often confused with general programming languages, e.g., SQL, Unix Shell Language, MATLAB, etc. Common domains that DSLs address include computer graphics, financial products, telephone switching systems, protocols, operating systems, device drivers, routers and networks, database queries, robot languages, etc. Some DSLs are designed from first principles after an extensive study of the domain of application, while a few other DSLs are designed by extending and/or restricting an existing generic programming language. The latter of the DSLs are referred to as embedded DSLs.

In the exemplary embodiment of the present invention, i.e., the database query engine, HaskellDB is used as the domain specific language. Being derived from Haskell, HaskellDB is also functional in nature. As opposed to imperative languages wherein programs begin with an initial declaration of the system state in terms of the system variables, functional languages have no explicit or implicit state declarations. Moreover, a functional language has no fixed sequence of execution, whereas in an imperative program, each subsequent statement results in a modification of the system state.

Functions are the first-class members of any functional language. They can be stored in data structures, passed as arguments, and returned as results. Other properties of functional programming include lazy evaluation, data abstraction, and pattern matching.

HaskellDB is an embedded DSL derived from Haskell and is used to guarantee a type safe embedding of database queries and operations within Haskell. Instead of sending plain SQL strings to a database, queries are expressed with normal Haskell functions. Haskell's type system is used to check the queries at compile time. Rather than receiving a run time error message indicating that, e.g., a field name does not exist, a type error is reported at compile time. Queries are performed through the HaskellDB query monad which is a first-class value and can be stored in data structures, passed as an argument, or can take on typed parameters.

HaskellDB possesses embedded types that define the elements of a relational database. Each query generation operator is defined by these types. Unless the type specification of the database entries matches the input type of the query generator, one cannot define a legal query operation. The embedded types of HaskellDB are:

1. Relation: A relation groups together a collection of attributed values. It is represented by the abstract type REL.
2. Table: Relational databases represent relations via tables, and HaskellDB defines a Table type that is parameterized over the type of the relation.
3. Attributes: A relation associates a collection of attributed values. In HaskellDB, attributes are first-class values, all of which have the Attr type.
4. Expressions: Expr is essentially an abstract syntax tree representation of possible SQL expressions. It is a data type whose values correspond directly to SQL expressions. The roll of the type parameter is analogous to that played by types in most programming languages—it prevents the user from constructing Expr values that correspond to ill-formed SQL expressions.

Thus, in HaskellDB, a database or Table r, consists of a collection of rows or relations of type Rel r, where each column or attribute or field of type Attr (Expr t), is named and contains a value of type Expr t.

HaskellDB provides a finite set of operators for the specification of a database application. Table 1 is a list of HaskellDB database and set operators. HaskellDB also uses Boolean, relational, arithmetic, and string operators.

TABLE 1

| Operator | Explanation |
|---|---|
| ! | The extraction operator (!) is used to select a particular column out of a Table or out of a Row. |
| project | The project operator, also a standard operator in SQL, is used to build up rows of table from columns/expressions. |
| restrict | The restrict operator generates queries to restrict the table to satisfy a given condition. |
| table | The table operator generates a query for accessing any table or row in a given database. |
| union | The union operator is the query or relational analogue of the set union operator. It takes two queries, which must be "union-compatible" (that is, each table has the same fields, and the corresponding fields store values of the same Expr type), and returns their union, removing duplicates. |
| minus | The minus operator is the query or relational analog of the set difference operator. It takes two queries, which must be "union-compatible" (in the sense defined above), and returns the first with any rows from the second removed. |

TABLE 1-continued

| Operator | Explanation |
|---|---|
| intersect | The intersect operator is the query or relational analog of the set intersection operator. It takes two queries, which must be "union-compatible" (see the explanation of union , above), and returns their intersection. |

HaskellDB is a strongly typed language, and as such, using HaskellDB to specify a database application insures that a set of axioms based on type-safeness of the database queries will hold for the specification. As previously indicated, these axioms can be used to enhance the test model automatically derived from the formal specification. For instance, whenever the operator restrict is used in HaskellDB, the use of the operator guarantees that the fields accessed thereby exist in the relation.

Figure 5:
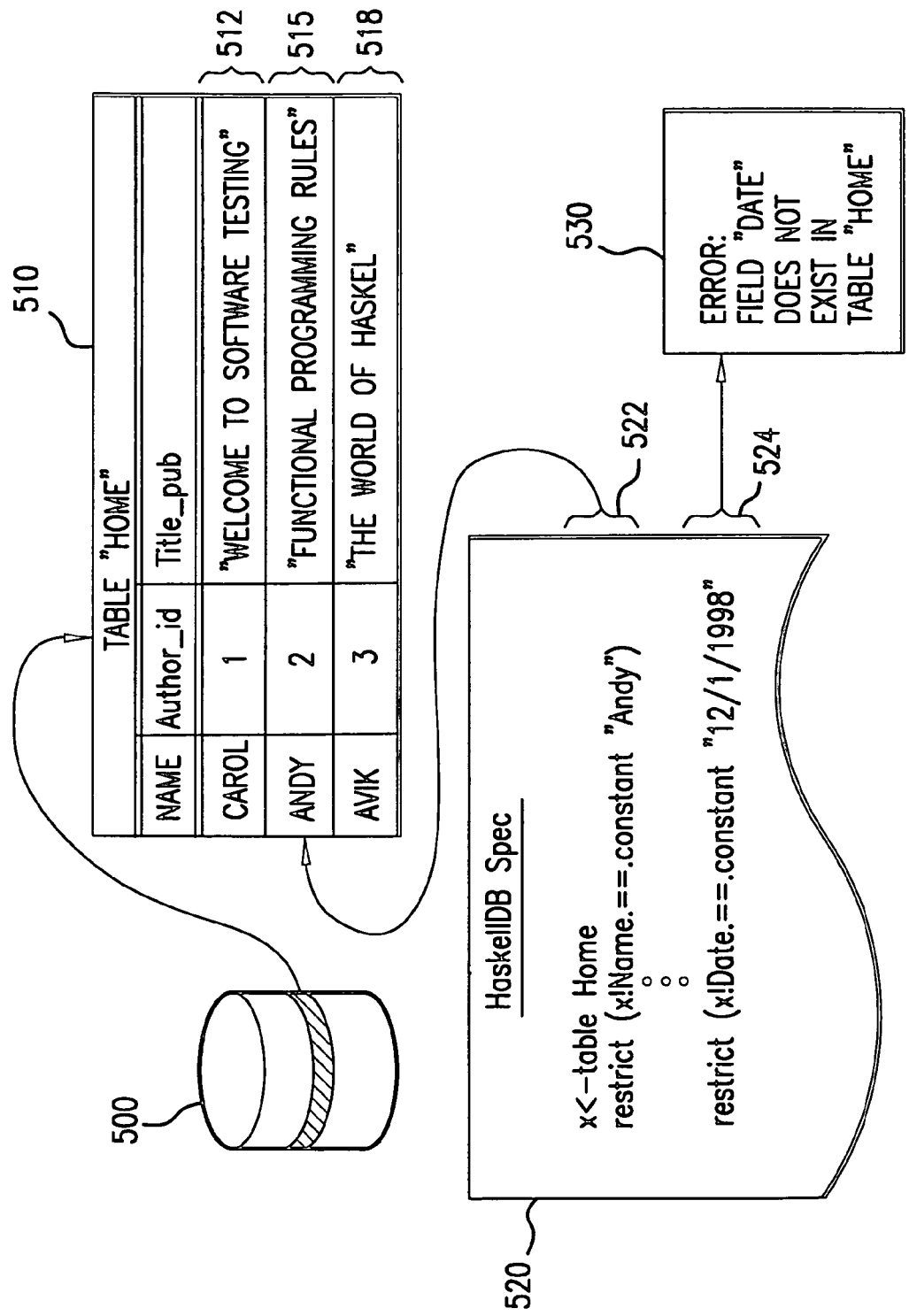
FIG. 5 is an illustration of an aspect of a database query engine test in accordance with the present invention.

FIG. 5 illustrates the axiomatic properties of HaskellDB operators, by way of a specific example. As is shown in the Figure, database 500 contains a table "Home", indicated at 510. The table 510 contains three entries 512, 515, and 518. Next, consider a HaskellDB specification 520, which restricts, through line 522, the table "Home" to the second row 515. The output of statement 522 returns a query for the second row 515. Thus, the axiom for the operator restrict, in the illustrated case, states that the field "Name" does exist in the table "Home", otherwise the operation would not be possible. This is illustrated by statement 524 of HaskellDB spec 520. In this case, an attempt to restrict the table "Home" to a row containing the date "12/1/1998" should not be allowed as that field does not exist in the table. Thus an error message 530 is generated for the statement 524.

The domain specific requirement that builds on the axiom for the operator restrict states that the application should always throw an error or warning message that prevents the formation of a query for a non-existent field. The test model generated by the method of the present invention will extract this requirement automatically and test the application accordingly. The axioms derived for all other HaskellDB operators are shown in Table 2.

TABLE 2

| Operator/Function | Axiom |
|---|---|
| Assignment ← | The object on the RHS of the assignment operator must exist. |
| Database Operators | All fields accessed by the operator must exist in the corresponding database. The Boolean predicate for restriction and projection operation must be type consistent. |
| Comparison Operators | The compared fields on either side of the comparison operators must be comparable. |
| Boolean Connectors | The arguments must all be SQL Boolean expressions. |
| Bang ! | The field being extracted out of the relation argument must exist. |
| Set Operators | The database arguments must be of the same shape (that is, each table has the same fields, and the corresponding fields store values of the same Expr type) |
| Arithmetic Operators | The arguments must all be arithmetic expressions. |
| String Operators | The arguments must all be string literals. |

There are three constructs of HaskellDB which can be used to write a specification. The control flow and order of execution may be extracted from the three specification styles to derive an extended finite state machine.

The first of the three constructs is the do-notation which has the following form:

F1=do { ... F2 F3 F4 ... }

The do-notation is used to specify that the functions within the curly braces are to be executed in order from left to right. In the example above, when there is a call to function F1, function F2 is called and then function F3 and then function F4, etc. The functions F2, F3, and F4 are the children functions of F1 and are at a hierarchically lower level than F1. A do-sequence of functions is denoted as F1{SDO[F2, ... ,Fk]} which implies that F1 is the function specified using the do-notation and calls functions F2 . . . Fk in left-to-right sequence.

The second HaskellDB specification construct is functional composition, which is written F1∘F2∘F3( ... ), where ∘ is the functional composition operator. This notation is used to specify where one wishes to perform F3( ... ), then F2 on the result of that operation, i.e., F2(F3( ... )), and finally F1 on the result of F2 and F3, i.e., F1(F2(F3( ... ))). A composition of functions is denoted SCOMP[F1, F2, ... ,Fk], which implies that function Fk will be called first. Function Fk−1 will be called with the return value of function Fk and so on until function F1 is called with the return value of function F2.

The third specification construct is sequential juxtaposition, in which functions can be specified in any order. To then extract an implied specification in accordance with the method of the present invention, rules as to the order of function calls must be understood. To illustrate, consider the following sequential juxtaposition specification:

F1{F4}
F3{F2}
F2
F4{F3}
F5

In the example above, Fi{Fj} indicates that Fi directly calls Fj. If $Fi_c$ denotes that function i is called and if the completion of execution of function i is denoted by $Fi_d$, then the sequence of operations for the specification given above is: $F1_c F4_c F3_c F2_c F2_d F3_d F4_d$. F5 is not used, i.e., neither accepts nor provides a return value, which signals a problem in the specification. A sequential juxtaposition of functions is denoted: SSEQ[F1{F2}, ... ,Fj{Fk}, ... ,Fk].

Any HaskellDB specification is a sequential juxtaposition of functions with embedded combinations of do-notations, sequential juxtapositions and functional compositions. An embedded use of a specification construct is made by explicit reference to the construct. Thus, a typical specification, S, may be denoted as S=SSEQ[F1{F2}, F0{F1}, ... , Fj{Fk}, ... ,Fk[SDO[SCOMP[Fk+1, ... Fm], SSEQ[ ... ], Fm+1, ... ,Fn]}]. Note that SDO can only be called from a function in SSEQ or in SCOMP. Any of the specification constructs can be called within an SDO.

The method of the present invention maps a generic specification written in a domain specific language into a specification which specifies the actual order in which functions should be executed. In an exemplary embodiment of the present invention, the ordering of functions is achieved through an ordering function Order that reorders the functions in S to generate a new specification S'. Within S', a function F, which is a child function of a function G, is denoted by G{F} and a function F executed after a function G is denoted by {G;F}. The function Order orders the actual sequence of operations based on the specification construct.

The following defines Order in cases for the three specification constructs and for two basic combinations of fragments of a specification:

Case I. For the do-notation construct, Order (S)=S', where S=SDO[F1 ... Fk] and S' is the specification reordered by the actual sequence of operation. Thus, S'={F1;F2; ... ;Fk}.

Case II. For a composition of functions, Order (S)=S' where S=SCOMP[F1,F2, ... ,Fk] and S'={Fk;Fk−1; ... ;F1;}.

Case III. For a sequential juxtaposition of functions, Order (S)=S', where S=SSEQ[F0{F1},F1{G1}, ... ,Fk]. For a typical specification, a unique start function denoted by F0 is placed at the beginning of the specification. The Order function starts a depth first search (DFS), such as is known in the computing art, from F0 to produce the reordering of functions. Thus, Order (S)=DFS(S, F0)=S'. It should be noted that reordering the sequential juxtaposition of functions unravels the underlying hierarchy in the specification. Thus, S'={F0{F1{G1 ... ;} ... ;};}.

Case IV. The method of the present invention distributes the Order function over the different fragments of a specification, each fragment being written in accordance with one of the three specification constructs. Thus, if S1[F1, ... ,Fk] and S2[G1, ... ,Gn] are two fragments of a complete specification adhering to one of the three specification constructs (e.g., S1 may be a sequential juxtaposition operation and S2 may be a functional composition operation), the present invention would perform:

1. Order (S1[F1, ... ,Fj{S2[G1, ... ,Gn]}, Fj+1, ... , Fk])=Order (S1[F1, ... ,Fj(Order(S2[G1, ... ,Gn]}), Fj+1, ... Fk]).
2. Order ({S1[F1, ... ,Fk]; S2[G1, ... ,Gn]})={Order (S1[F1, ... ,Fk]); Order (S2[G1, ... ,Gn])}.

Using this definition of Order, the control flow of any HaskellDB specification can be extracted. For example, if N is the number of functions in the specification, i.e., the specification contains F1 to Fn and the specification is:

S=SSEQ[F1{F2}, F0{F1}, ... ,Fj{Fk}, ... ,Fk{SDO [SCOMP [Fk+1, ... ,Fn]; SSEQ[ ... ]; M+1; ... ;Fn]}].

The reordered specification is then:

S'=Order (S)={F0{F1{F2{ . . . Fj{Fk{Order(SDO [SCOMP[Fk+1, . . . ,Fm]; SSEQ[ . . . ]; Fm+1; Fn])} ... ;};};};}

(by ordering for case III and applying case IV #1),

S'={F0{F1{F2{ . . . Fj{Fk{Order(SCOMP[Fk+1, ... , Fm]); Order (SSEQ[ ... ]); Fm+1; ... ;Fn} ... ;};};};}

(by ordering for case I and applying case IV #2),

S'={F0{F1{F2{ . . . Fj{Fk{Fm; ... Fk+1; Order(SSEQ [ ... ]); Fm+1; ... ;Fn} ... ;};};};}.

The behavioral model of the present invention is ultimately obtained from the reordered specification. If S' is the reordered specification, a function TestMap is defined such that, TestMap(S')=$m_0$, where $m_0$ is the desired behavioral model and is defined as $m_0$=[$\Omega$, $\tau$, $St_{Start0}$, $St_{Exit0}$, $\Omega_0$ is a set of states and sub-models in $m_0$ whereas, $\tau_0$ is the set of transitions in $m_0$ mapping each state or sub-model in $\Omega_0$. $St_{Start0}$ is the starting state and $St_{Exit0}$ is the exit state for $m_0$. The target test model $m_0$ is the hierarchical mapping of stjtates and transitions of an EFSM.

In S', functions listed within a pair of curly brackets represent a group of functions, Gi, all at the same level of hierarchy in a fixed execution sequence. Each such group Gi is translated into a sub-model $m_i$ defined as $m_i$=[$\Omega_i$, $\tau_i$, $St_{Starti}$, $St_{Exiti}$].

TestMap translates each function Fj in S' to a transition $t_j$ based on the following rules:

Rule 1. If Fj is the first function in a group (Gi,(e.g., [Fj; ... ]), then a transition $t_j$ is created from $St_{Starti}$ to $St_j$ such that $St_j \in \Omega_i$ and $tj \in \tau_i$. Each model is initialized to state $St_{Start}$ and execution of the first function in the group Fj, signifies the first transition of states in the model.

Rule 2. If Fj is the last function in the group Gi(e.g.,[ . . . , Fj), then a transition $t_j$ is created to $St_{Exit i}$ and $t_j \in \tau_i$. Thus, each group terminates with the execution of a terminal function and each model exits on a transition.

Rule 3. If Fj is the function in the group Gi−1 that calls a group Gi, (e.g., Fj[Gi]), then a transition $t_j$ is created to enter the model $m_i$, at state $St_{Start i}$, where $m_i \in \Omega_{i-1}$, $t_j \in_{i-1}$.

Rule 4. If Fk sequentially follows Fj in group Gi, (e.g., [ . . . ,Fj;Fk; . . . ], then a transition $t_k$ is created to $St_k$ from $St_j$ such that $[St_j, St_k] \subset \Omega i$, $t_k \in \tau_i$.

Rule 5. If Fk immediately follows the call of group Gi in a group Gi−1(e.g., [ . . . ;[Gi];Fk; . . . ]), then a transition $t'_i$ is created to $St_k$ from $m_i$ such that $\{m_i, St_k\} \subset \Omega_{i-1}$, $t'_{i \in \tau_{i-1}}$.

Any S' is uniquely defined by a set of functions [F0, . . . Fn] and an underlying control flow which is expressed through various combinations of sequences of functions and the embedded function calls. Rules 1 to 5 address all possible flows in S' and hence, are necessary and sufficient to derive an EFSM from any S'. This also implies that the TestMap function is a unique mapping function that differentiates between specifications differing in either the set of functions or the underlying control flow.

For the instance of S'={F0{F1;F2{F3};F4;};}., TestMap (S')=$m_0$={$\Omega_0$, $\tau_0$, $St_{Start 0}$, $St_{Exit 0}$}, where $\tau_0$={$t_1, t_2$}. Whereas $t_1$ corresponds to a call of F0 and $t_2$ corresponds to the end of execution of F0, $t_1$ is a transition to model $m_1$ and $t_2$ is the transition to $St_{Exit 0}$, as shown in FIG. 1.

The test model of FIG. 1 captures the requirements imposed by the initial specification S. To implement a test model that captures and tests the implicit domain properties, it is necessary to derive an EFSM with defined axiomatic properties. To do so, variables on which functions act need to be introduced explicitly. Axioms are properties that must be true of the parameters of a function. For example, a comparison operation, x<y, the operator of interest is "<". As indicated in Table 2, the use of a comparison operator forces the property "compared fields on either side of the comparison operator must be comparable" to be true of both x and y.

To derive the EFSM accounting for axiomatic properties (EFSMA), the explicit treatment of variables on the three specification constructs must be considered.

A variable in the functional specification is defined through assignment operations. In HaskellDB, the values returned by functions are assigned to the variables and the variables have the same type as the return type of the functions. A variable can be input to the function (parameter) or it can be defined within the function (local variable). Within a function, visibility to variables is confined to the parameters and the local variables. There are no global variables in a HaskellDB specification. The symbol $S_x$ will denote a specification with explicit reference to variables.

A function VariableMap which reorders the functions in $S_x$ while accounting for variables. $S_x$ is the resulting specification. Variables are categorized according to the following:

1. Definition: The variable is said to be defined if the function using it associates a value and a type to the variable. A definition of the variable is denoted by $x_d$.
2. Computation: The variable is said to be used in computation when the variable is used by a function to define any other variable. A computational use of x is denoted by $x_c$.

VariableMap is implemented for the three different specification constructs as follows:

(a) Do-notation: For an extract of do-specification with explicit reference to the function variables, $S_x$=F0(x) [SDO[Y=F1(x);Z=F2(y);]]
VariableMap($S_x$)=$S'_x$ is defined such that $S'_x$=F0($x_d$){F1 ($y_d, x_c$);F2($z_d, y_c$)}]. It should be noted that $x_d$ refers to a variable x defined during the call to function F0, $y_d$ is the variable y defined by a computational use of variable x by function F1 and variable z is defined by a computational use of variable y by function F2.

(b) Functional Composition: Introduction of variables within a functional composition leads to the following expression: Sx=F1●F2●F3(x)=SCOMP[F0,F1,F2 (x)]. As previously discussed, functional composition may appear outside or within a do-notation. Within a do-notation, variable x has to be defined before it is used in the composition. Outside the do-notation, variable x can be defined anywhere in the Specification $S_x$. Thus: VariableMap($S_x$)=$S'_x$, where $S'_x$=[F2(F2(x)$_d$, $x_c$;) F1(F1 (F2(x))$_d$, F2(x)$_c$; F0(F0(F1(F2(x)))$_d$F1(F2(x)$_d$))].

(c) Sequential Juxtaposition of Functional Terms: For the sequential juxtaposition, VariableMap operates on $S_x$=SSEQ[F0(x){F4(x)}, F3(x), F4(y){(F3(y)}] as:

VariableMap($S_x$)=$S'_x$=F0($x_d$){F4($y_d, x_c$){F3($x_d, y_c$)]}

Thus, the specification given above, with the variables introduced, $S_x$=SSEQ[F1(x){F2{x}}F0(y)(F1(y)} . . . Fj(z(Fk(z)}, . . . Fk(x){SDO[SCOMP[Fk+1, . . . Fm(x)]; SSEQ[ . . . ];Fm+1(y); . . . ;Fn(x)]}] results in $S'_x$=VariableMap($S_x$)=F0($y_d$){F1($x_d, y_c$){F2( . . . ,$x_c$)
{ . . . Fj($z_d$ . . . ){Fk($z_d, z_c$){Fm($x_d, z_c$) . . . ;Fk+1
( . . . ); VariableMap(SSEQ[ . . . ];Fm+1]
($y_d$, . . . ); . . . ;Fn($x_d$)} . . . }}}.

The first step in producing an EFSM with mapped variables is the application of a function Filter that differentiates functions belonging to the standard HaskellDB library from functions that do not. The HaskellDB functions are those to which axioms are associated.

Let $S'_x$=F0($x_d$){ . . . Fi($y_d, x_c$){ . . . Fj−1($y_d, x_c$) Fj($y_d, x_c$) . . . Fj+1($y_d, x_c$) . . . Fn($y_d, x_c$)}}] be an ordered specification such that Fj is a library function. Then, Filter(S')=S, $S''_x$ where $S''_x$=F0($x_d$){ . . . Fi($y_d, x_c$){ . . . Fj−1($y_d, x_c$)A0($y_d, x_c$)Fj+1($y_d$, $x_c$) . . . Fn($y_d, x_c$)}}}. A0 is an action representing the call to the standard library function Fj and Fj'=F+1, . . . F'n−1=Fn. Having derived $S''_x$, the reordered specification with embedded variables and identified library functions, we proceed to extract the EFSMA. To do so, a function TestMap$_x$ is defined such that TestMap$_x$($S''_x$)=$m_{0x}$ where $m_{0x}$ is our test model with variables and is given by $m_{0x}$=[$\Omega_0$, $\tau_0$, $St_{Start}$, $St_{Exit}$, $V_0$]. The function TestMap$_x$ is an extension of TestMap such that $m_{0x}$=$m_0 \cup (V_0)$ where $V_0$ is the set of variables for states in the set $\Omega_0$. If $V_{ti0}$ is the set of variables in transition $t_{i0}$ (i.e., the variables used in the corresponding function), then $V_0$=$V_1$, $\cup V_{2c} \cup V_{m0}$ and [$t_{10}, t_{20} \ldots t_{n0}$]=$\tau_0$. The set is similarly derived for the sub-models in $m_{0x}$.

Thus, if $S'_x$={F0($x_d$){F1($y_d, x_c$); F2($z_d, y_c$){A1($y_d, z_c$); F3($x_d, y_c$);};}}, then TestMap$_x$($S''_x$)=$m_{0x}$=[$\Omega_0$, $\tau_0$, $St_{Start}$, $St_{Exit}$, $V_0$], which is shown in FIG. 1 when the variables are considered.

Once the variables have been introduced to the test model, the related axioms are embedded into $m_{0x}$ so as to derive the EFSMA. Each call to a HaskellDB library function associates one or more properties with the variables on which the function is acting. As previously stated, all calls to the HaskellDB library functions are represented by actions in the filtered specification $S''_x$ Thus, each action in $S''_x$ possesses a set of properties which hold true for the variables on which it operates. These properties can either be satisfied by the associated implementation or not. The test model generated by the present invention tests both cases. This requires that two additional states in the test model be created. The first one will generate a test case which satisfies the axiom. The second one generates, if possible, a test case that violates the axiom so as to ascertain whether the application is protected against the violation or not.

Let X represent the set of variables on which a library function Ai acts. For each Ai(X) in $S''_x$ a set of properties given by Pi(X)=[p1(X), . . . pm(X)] hold. A function, TestProperty is defined such that TestProperty($m_x$, $P_i$(X))=$\tau_i^x$, where $$\tau_i^x = \coprod_{j=1}^{n} \{t_j \bar{t}_j, t_{jExit}\}$$

and $m_x$ represents the test model or any of the sub-models. If $St_{i,j}$ is the system state where property $p_{i2}$ holds and $St'_{ij}$ is the state where it does not hold, then $t_j$ is a transition to the state $St'_{ij}$ from the state $St_{ij-1}$ and $t_j$ is a transition to the state $St_{ij}$ from the state $St_{ij-1}$. Further, $t_{j,Exit}$ is a transition from $St_{ij-1}$ to $St_{Exit}$. Additionally, $$\Omega_i^x = \coprod_{j=1}^{n} \{St_{i,j}, St'_{i,j}\}.$$

If there are n transitions representing the actions A1, . . . An in $m_x$, we define $$\tau_{Axioms} = \coprod_{j=1}^{n} \tau_i^x \text{ and } \Omega_{Axioms} = \coprod_{j=1}^{n} \Omega_i^x.$$

The EFSMA is obtained by defining a function AxiomMap such that if $m_x$={$\Omega, \tau, St_{Start}, St_{Exit}, V$}, then AxiomMap($m_x$)=$m_x'$, where $m_x'$=[$\Omega', \tau', St_{Start}, St_{Exit}, V$]; $\tau'=\tau \cup \tau_{Axioms}$ and $\Omega' = \Omega \cup \Omega_{Axioms}$.

Figure 2:
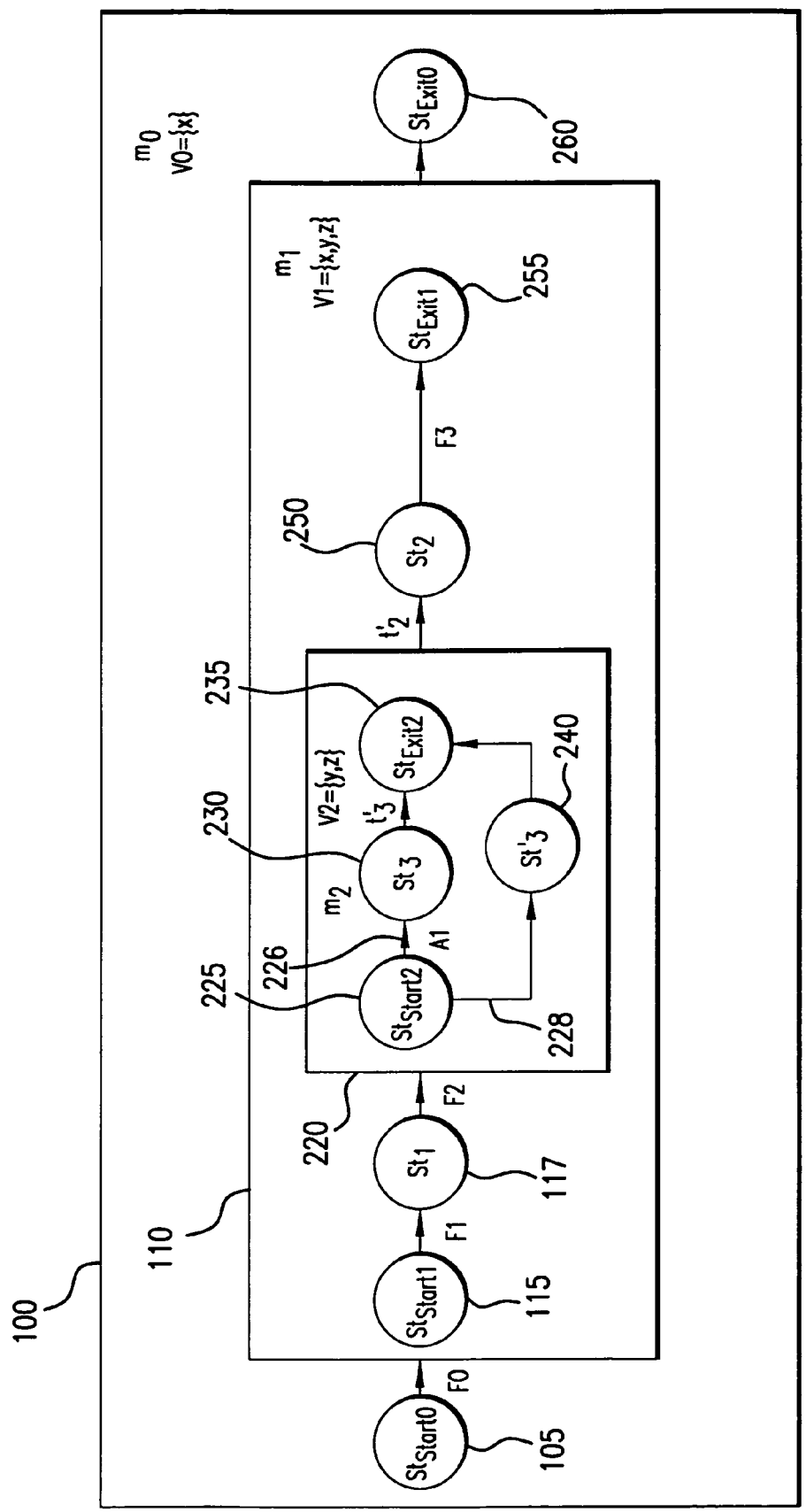
FIG. 2 is a state diagram of an extended finite state machine which observes axioms of the domain specific language.

Referring now to FIG. 2, there is shown an exemplary EFSMA. Models 100 and 110 are the same as the corresponding models of FIG. 1, where like reference numerals refer to like elements. Model $m_2$, indicated at 220, has been modified in accordance with the present invention to account for an axiomatic property of action A1. The sub-model $m_2$ is initialized to a starting state $St_{Start2}$, at 225, and is exited upon a transition to state $St_{Exit2}$, shown at 235. As previously described, two test cases corresponding to two state transitions are generated for action A1. A first state transition, shown at 226, corresponds to the axiomatic property being satisfied and a second state transition is created, shown at 228, for the case where the axiomatic property is violated or is not satisfied. If the axiom is satisfied, sub-model $m_2$ is placed into state $St_3$ at 230. Otherwise, when the axiom is not satisfied, sub-model $m_2$ is set to state $St'_3$, as shown at 240. As before, a transition $t'_3$ places sub-model $m_2$ at state $St_{Exit2}$, shown at 235. However, for the EFSMA, a second transition to exit state $St_{Exit2}$ must be generated from state $St'_3$ to correspond to the path generated for the axiom not being satisfied.

FIG. 2, as compared with FIG. 1, clearly shows an advantage of the method of the present invention. The EFSMA of FIG. 2 has an extra test case corresponding to the extra state transition over the model of FIG. 1. In similar systems of the prior art, the extra test cases accounting for implicit requirements of the functional specification are not generated and therefore go untested. The method of the present invention, by translating the functional specification into a domain specific language specification and advantageously using the axiomatic properties of the domain specific languages operators, is able to automatically generate test cases which were not explicitly set forth in the natural language specification.

Predicate logic allows the introduction of context information into the test models of the present invention. The predicate information is captured from the conditional flow constructs of HaskellDB, which can exist only in a SSEQ or SDO specification construct.

In the following, the function VariableMap is extended to account for the conditional flow. Conditional flow in HaskellDB can be created via three possible flow constructs. For each conditional constructor, the function VariableMap introduces a condition Ci(X) to the corresponding specification fragments. Ci(X) can be uniquely described by the variable X and the constraint associated therewith. If the constraint is satisfied by the variable, then Ci(X)=True, otherwise Ci(X)= False. The constraint is composed of a relational operator and a constraint value. Hence, a condition is formally represented as:

$P(X) = (X\ RO\ \text{Value})$ where $RO \in [.==.,!=.,>=.,<=.,>.,<.]$

The function VariableMap extracts the condition for each conditional constructions in HaskellDB, as will be described below. Let $S_0$ represent an exemplary HaskellDB specification, which has specification fragments $S_1, S_2, \ldots S_n$, each adhering to any one of the three specification styles described hereinabove. Further, let X represent the set of variables, x represent any particular variable and $x_i$ represent any value assumed by the variable x. The flow constructs are then:

1. If then else: The if-then-else construct of HaskellDB is the counterpart of the if-then-else in procedural languages. The general syntax for if-then-else is given as:
   if (Pi(X)) then (Consequence)else(Alternative)
   Pi(x) is a Boolean expression on X that can either be True or False. The Consequence and the Alternative are HaskellDB specification fragments. The variable evaluated in the predicate needs to be defined before its use. Consider an example specification, S0, with an if-then-else construct such that:

$S_0$=SSEQ[$F0(x)$[if $P1(x)$) then $S_1$[ . . . ] else $S_2$[ . . . ])]

Then, VariableMap($S_0$)=$S'_0$ such that $S'_0$=$F0(x_d)$ [C1(x)=>VariableMap($S_2$[ . . . ])], where C1(x)=P1(x), C2(x)=$\overline{P1(x)}$).

2. Case constructor: The case constructor of HaskellDB has the following syntax:
   Case (X) of
   (Value 1)->Consequence 1
   (Value2)->Consequence 2
   . . .
   (Value n)->Consequence n
   Value i is a possible value assumed by the set of variable X. A value of '_' signifies the default value of the set of variables. The consequences must be valid HaskellDB specification fragments. Consider an example specification with an explicit reference to the case constructor.

$S_0$=SSEQ[$F0(x)$[Case($x$) of
   ($x_1$->$S_1$[ . . . ]
   ($x_2$->$S_2$[ . . . ]
   (_)->$S_3$[ . . . ]

Then, VariableMap($S_0$)=$S_0$' such that $S'_0$=F0($x_d$) [C1(x)=>VariableMap($S_1$)][C2(x)=>VariableMap($S_2$)] [C3(x)=>VariableMap($S_3$)], C1(x)=(x.==.$x_1$), C2(x)= (x.==.$x_2$) and $$C3(x) =$$
$$\overline{(\overline{C1(x)} \text{ AND } \overline{C2(x)})} = \overline{\overline{C1(x)}} \text{ OR } \overline{\overline{C2(x)}} = ((x \mathrel{!=} x_1) \text{ OR } (x \mathrel{!=} x_2))).$$

3. Pattern Matching: Pattern matching can bear any of the following two allowable syntaxes in HaskellDB:

(a) F(x){
 |Pattern(x)$_1$ → Consequence1
 |Pattern(x)$_2$ → Consequence2
 ...
 |Pattern(x)$_n$ → Consequence n
 }
(b) F(Pattern (x)$_1$)=Consequence 1
 F(Pattern(x)$_2$)= Consequence 2
 ...
 F(Pattern(x)$_n$)=Consequence n Again, the consequences need to be valid HaskellDB specification fragments. Pattern(x) is a regular constraint with a relational operator and a constrain-value defined on the variable x. Consider an example specification with an explicit reference to the pattern matching constructor.

$S_0$=SSEQ[F0(x){
 |Pattern($x_1$- > $S_1$[...]
 |Pattern($x_2$- > $S_2$[...]
 }]

Then, VariableMap($S_0$)=$S'_0$ such that $S'_0$=F0($x_d$) [C1(x)=>VariableMap ($S_1$)][C2(x)=>VariableMap ($S_2$)], C1(x)=Pattern(x)$_1$), and C2(x)=Pattern(x)$_2$).

The function Filter may then be applied to the re-ordered specification to differentiate the functions that belong to the standard HaskellDB library from the functions that do not. The Testmapx function is then applied to the re-ordered specification.

EFSMAP is an extension of the EFSMA with each transition in the test model also characterized by the governing predicate. The default value of these predicates is set to NULL. TestMapx is extended to account for the conditional flow by adding a rule 6 and also by modifying rule number 3 of the TestMap function to form test cases for functions passing control to multiple groups:

Rule 3(modified): If Fj is the function in the group Gi that calls k groups $G_j+_1$, ... $G_i+_k$, (e.g., Fj[$G_j+_1$] ... [$G_i+_k$] then k transitions $t_{j1}$, $t_{j2}$, ... $t_{jk}$ are created to the models $m_{j+1}$, $m_{j+2}$, ... $m_{j+k}$ where $(m_{i+1},m_{i+k})\cup\Omega i,\{t_{j1}, \ldots t_{jk}\}\cup\tau i$ Rule 6: If group Gi is initiated on condition Cj(x) being True and if $t_k$ is the transition that corresponds to initiation of Gi, then $t_k$.predicate=Cj(x).

Let S" be the reordered specification accounting for the variables and for the conditional branching of functions with identified library functions. Then, given S'={F0($x_d$) (C1(x)=>F1($y_d$, $x_c$); F2($z_d$, $y_c$) {A1($y_d$, $z_c$)}};}{C2(x)=>F4 ($x_d$, $y_c$);}}, TestMap(S"$_x$)=$m_{0x}$={$\Omega_0,\tau_0$,St$_{Start}$,St$_{Exit}$, $V_0$}.

Figure 3:
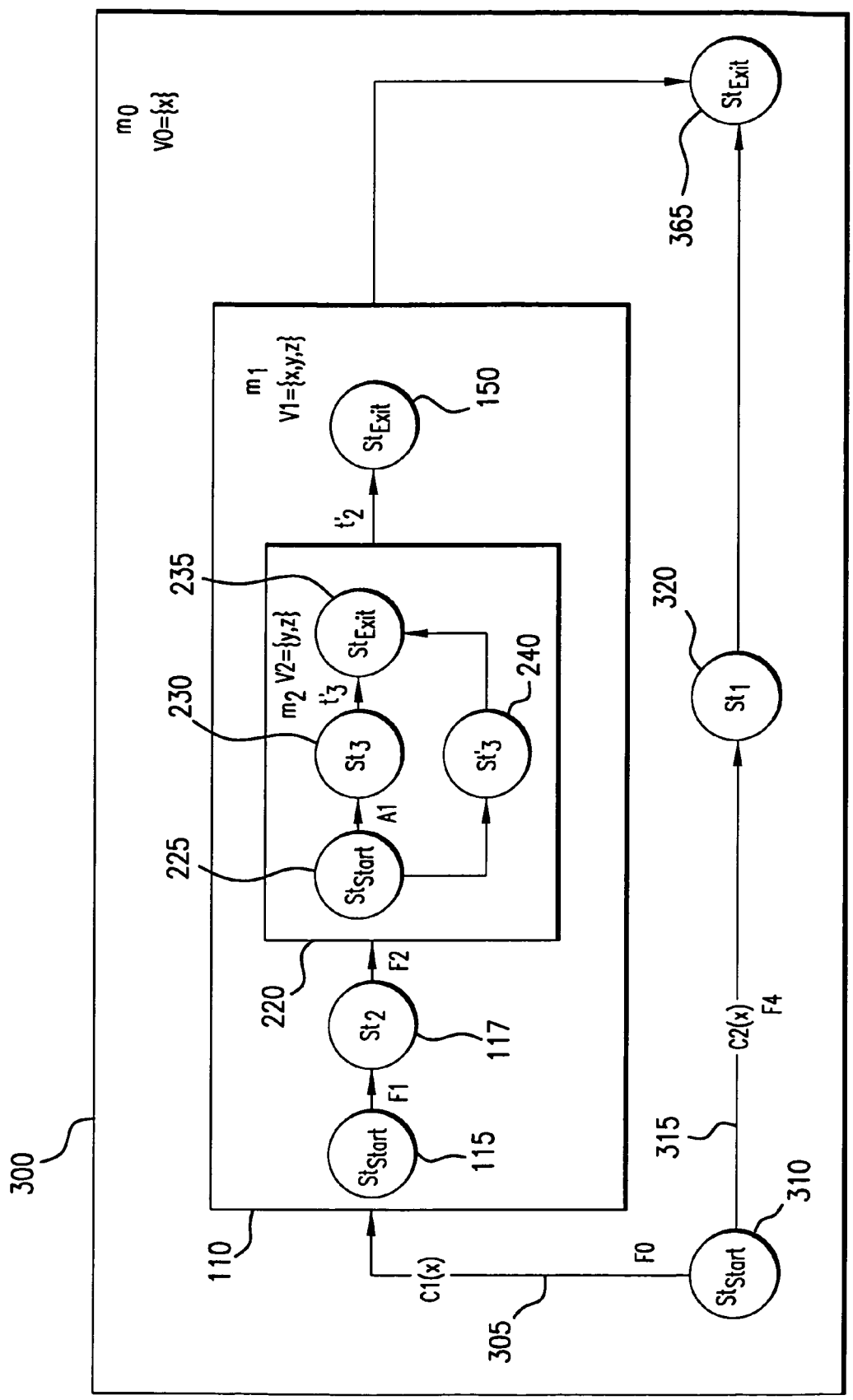
FIG. 3 is a state diagram of an extended finite state machine which observes both axioms and predicates.

Referring to FIG. 3, an exemplary extended finite state machine which takes into account the axiomatic properties of the HaskellDB operators as well as the conditional flow of predicate logic is shown. Sub-model $m_2$, which takes into account the axiomatic property of action A1 is as was shown in FIG. 2. Sub-model $m_1$ is as was shown in FIG. 1. Sub-model $m_0$, shown at 300, illustrates an example of the use of conditional flow in a HaskellDB specification. The state machine shown in FIG. 3 is referred to as an EFSMAP.

As is shown in the Figure, model $m_0$ is initialized to state St$_{Start}$, as indicated at 310. Subsequently, function F0 is called, whereupon the variable X is evaluated. The EFSMAP of FIG. 3 illustrates the conditional flow of, for example, an if-than-else conditional construct. As previously indicated, for the if-than-else construct, C1(x) refers to the transition associated with the "True" condition and C2(x) refers to the "False" condition. The method of the present invention generates a state transition, and thereby an associated test case, for all conditions (including the default condition of a case operator) of a conditional construct. For the exemplary if-than-else case of FIG. 3, the state transitions 305 and 315 are generated. For the "True" condition, the model $m_0$ is placed at the start state of model $m_1$ through transition 305. If the condition on x is evaluated as "False", a function call to function F4 is made. The function call to F4 places the EFSMAP at state St$_1$ as shown at 320. Model $m_0$ is exited upon transition to state St$_{Exit}$, as shown at 365, either through the "True" path or the "False" path.

Recursion is the only means by which the repetitive tasks in HaskellDB may be implemented. Recursions are characterized by a base case definition and the recursive relation. A recursion cannot be modeled explicitly into state machines primarily because the number of states and transitions depend on the input to the function and cannot therefore be predetermined. Consider the following example for calculating factorials by recursion:

Fact 0=1

Fact $x$=$x$*Fact $x$−1

This can be written in a more generic form as:

SSEQ[F1(x)[
 |x. == .$x_1$- > $y_1$              base case
 |x.!= x1- > SSEQ[F2(x)(SCOMP[F1,F3(x))]]   recursive rule
 ]

where F1=Fact, F2=multiplication operator and F3=unary subtractor. It should be observed that the number of calls to F1 depends on the value of x. As the input varies, so does the number of states in the model. F3 determines how x is modified with each recursive call. The recursion will halt iff F3" (x)=$x_1$ for some finite Termination Rule.

To validate F1(x) of a HaskellDB specification, consider $x_2$ such that F3"($x_2$)=$x_1$. If, by assuming that F1(F3($x_2$)) is correct, F1($x_2$) can be validated. Then, by induction, F1(x) is validated, provided that the base case, F1($x_1$)=$y_1$, is true.

In order to keep the number of states finite and predetermined, a similar technique is adopted for test modeling. It can be assumed that for a properly formulated HaskellDB specification, the termination rule is satisfied. The behavioral model simulates the base case and the recursive rule. If a function is correct for the recursive rule and the base case, then it can be said that the function is correctly implemented for any input. The recursive rule can be validated by modeling the function for one iteration. A test suite for testing iteration must exercise the base case at least once. A larger the number of test cases exercising the recursion results in a larger confidence in the recursion function.

Figure 4:
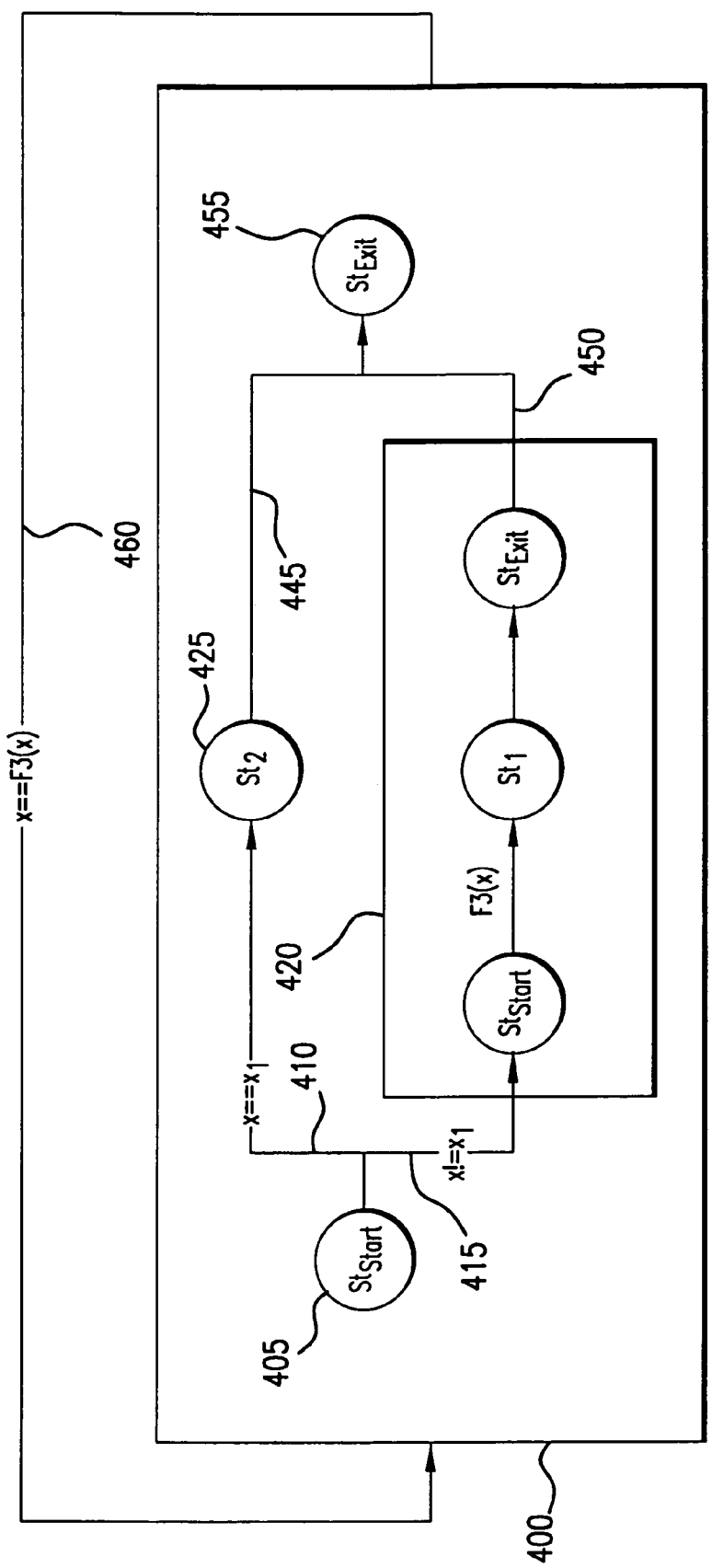
FIG. 4 is a state diagram of an extended finite state machine which models recursive algorithms.

A behavioral model for testing recursion is illustrated in FIG. 4. As in the previous cases, the model 400 is initialized to a start state, $St_{Start}$ at indicator 405 and exit upon transition to an exit state $St_{Exit}$, as shown at 455. Sub-model 420 implements a function F3(x) and $x_1$ is the value of the variable x at which the iteration is to terminate. As is illustrated in the Figure, transition path 410 corresponds to the terminating case, whereby the model 400 is placed in state $St_2$, shown at 425. The second transition path, shown at 415, is taken for the non-terminating case whereby function F3(x) is called. A transition from $St_2$ to the exit state $St_{Exit}$ (shown at 455) is indicated at 445 and the alternative, non-terminating transition path from F3(x) to exit state $St_{Exit}$ is shown at 450. The iteration path 460 assigns the value of x to the return value of F3(x) and places the behavioral model at the start state of model 400. As previously discussed, iteration path 460 may be constrained to one iteration and will thoroughly test the modeled recursion if both the base case and the termination case (in addition to the recursive step) are tested.

Figure 6:
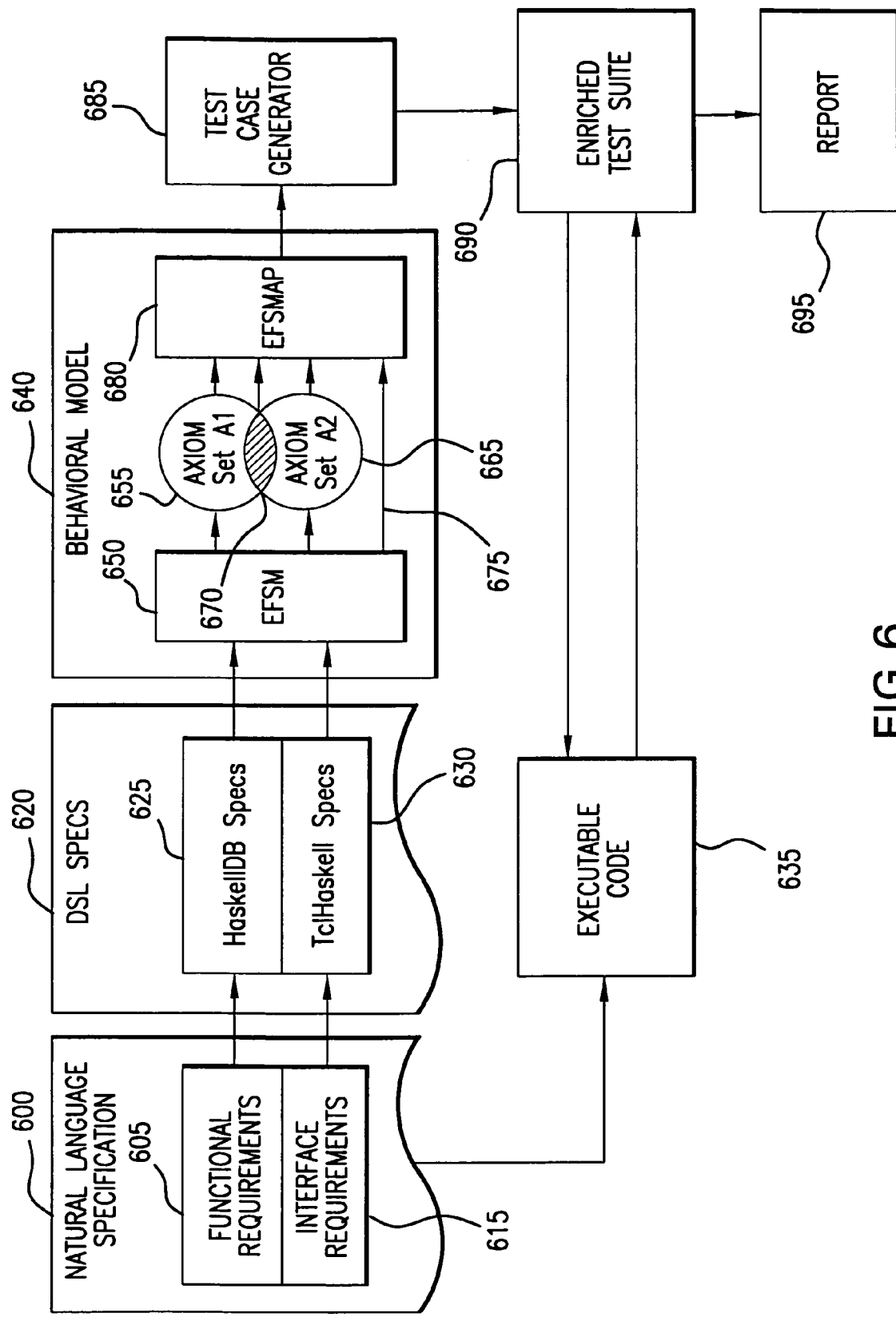
FIG. 6 is a block diagram illustrating a test system for carrying out a software testing embodiment of the present invention.

An exemplary system for carrying out the method of the present invention is illustrated in FIG. 6. A natural language specification 600 of the software system, e.g., the exemplary database query engine, consists of both functional requirements 605 and interface requirements 615. In the exemplary database application, functional requirement 605 may include a description of the fields of the database, means by which the database may be accessed, query language syntax, etc. Interface requirement 615 may include details of a graphical user interface. Such specifications are typical in the art and need not be described further here.

Natural language specification 600 is translated into one or more domain specific languages to produce DSL specification 620. The translation may be implemented manually, by parsing, or by other translation means.

For the exemplary database query engine, a specification in HaskellDB, shown at 625, may specify the functional requirements and a specification in TclHaskell, indicated at 630, may be used to specify the interface requirements. TclHaskell is another Haskell-based domain specific language implementing a library of functions for writing platform independent graphical user interfaces. Thus, it is a language specific to the GUI domain and has associated therewith a set of axioms, each of which corresponds to a TclHaskell operator. Thus, the method of the present invention may construct a behavioral model from a TclHaskell specification by similar means to the HaskellDB behavioral model construction methodology described hereinabove and by defining a set of axioms for the operators of the language.

A behavioral model 640 is extracted from the DSL specifications 620 in accordance with the method of the present invention. The underlying methodology for the behavioral model extraction has been described hereinabove and will be exemplified in paragraphs that follow.

As has been discussed, an extended finite state machine 650 is generated from the DSL specification by the present invention. From the EFSM 650, a set of axioms 655 corresponding to the HaskellDB operators and an axiom set 665 corresponding to the TclHaskell operators are embedded therein to produce EFSMAP 680. The axiom sets 655 and 665 contain the implicit behavior of the behavioral model, i.e., the behavior not explicitly set forth in the natural language specification 600. The explicit behavior is also included in the EFSMAP 680, as shown at 675.

In the exemplary embodiment of FIG. 6, each of the domain specific languages of the DSL specification 620 is derived from a common functional language, i.e., Haskell. As such, it should be clear to one versed in the art that there would be some overlap in the axiomatic properties of the respective operators. The intersection 670 of the two sets of axioms 655 and 665 defines a third set of behaviors associated with the interaction of the functional requirements of the database and the interface requirements of the database. Thus, by embedding the set intersection 670 into the EFSMAP, test cases may be generated specific to the interaction of the functional requirements and the interface of the application.

A representation of the behavioral model 640 is communicated to a test case generator 685. Test case generators which output a set of test cases from a representation of an extended finite state machine are commercially available. One such test case generator is Empirix's TestMaster, which takes at its input an imported model command file (IMCF) and outputs a test case for each valid path through the behavioral model. The test case includes the test information held in each transition path of the EFSM.

The set of test cases from test case generator 685 is transmitted to a test suite application 690, such as Mercury Interactive's Winrunner Automated Test Tool. The test suite 690 generates a test script for each test case presented at its input and executes the test script on the executable platform 635. The executable 635, generally, is developed independent of the reliability testing. The results of running the test script on the executable code 635 is transmitted back to the test suite program 690 and the test results are communicated to a testing authority via a test report 695. Generally, such a report will indicate a resulting behavior of running the test script on the executable code. This behavior can then be compared by the testing authority to the behavior specified in the natural language specification to insure that the executable code is operating as specified. Moreover, the method of the present invention, as previously discussed, generates test cases for behaviors not explicitly specified in the natural language specification. By testing the executable code 635 against these behaviors, a more reliable and stable final software product is produced.

Figure 7:
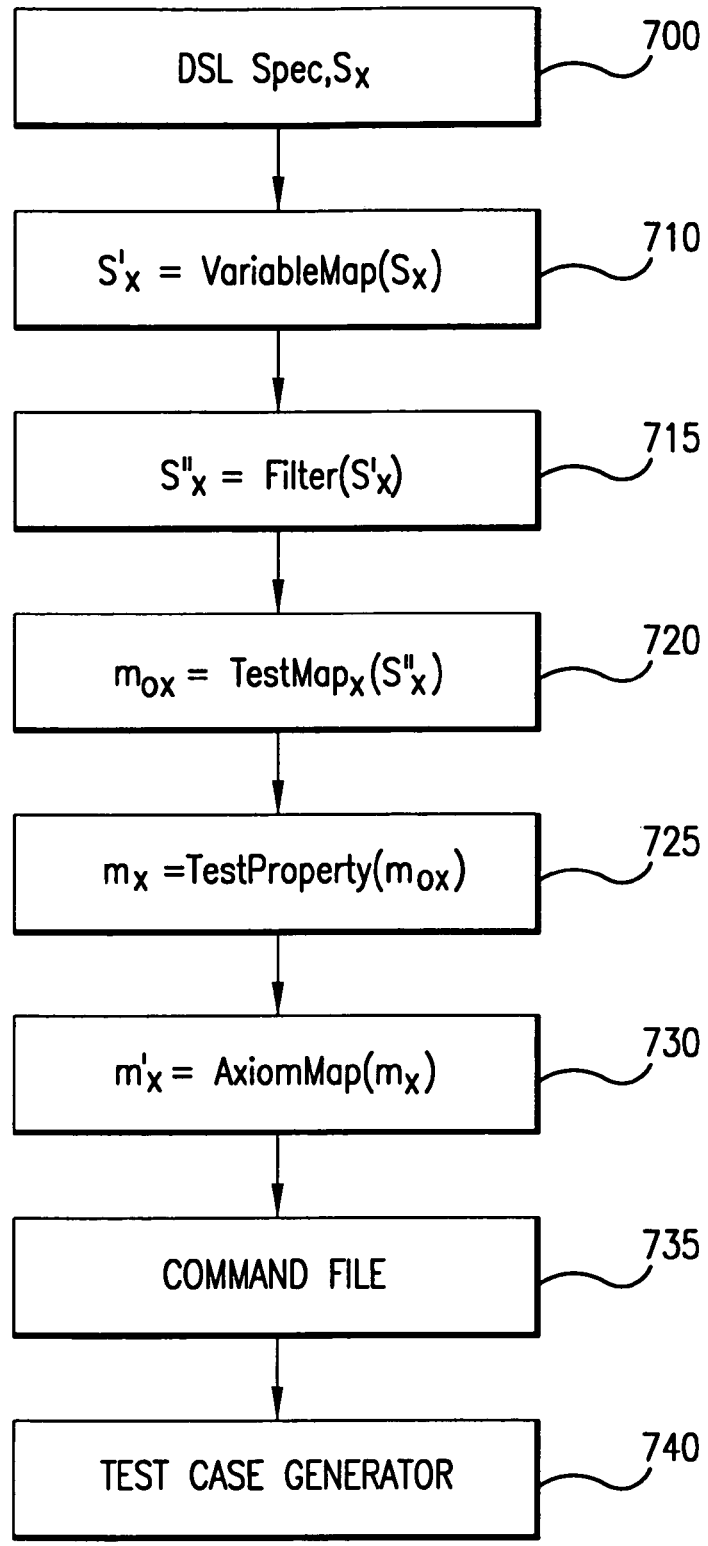
FIG. 7 is a block diagram depicting the pertinent steps of the present invention for generating test cases from a domain specific language specification.

Referring to FIG. 7, there is shown a flow diagram of the pertinent steps of the method of the present invention. From the domain specific language specification 700, e.g., HaskellDB and TclHaskell, a specification, S'$_x$=VariableMap(S$_x$) is produced in block 710. VariableMap, as previously described, orders the actual sequence of operations as specified by the applicable specification construct and accounts for the declarations of, and computations with, variables. The new specification, S'$_x$ is filtered in block 715 to differentiate the standard library functions of the DSL from non-standard functions. The standard library functions are those to which axioms are associated.

The filtered specification, S''$_x$ is communicated to block 720 where the function TestMapx function is applied to produce an EFSM with embedded variables. Flow is then transferred to block 725 at which the function TestProperty is applied to extract the one or more properties associated with the variables on which the standard library functions act. TestProperty is responsible to generate a transition path for all of the various conditions placed on a variable x and their complements.

The updated model is received by the function AxiomMap in block 730 which produces the final EFSMAP in accordance with the procedure described hereinabove. The final model is used to generate a command file 735, or other representation compatible with the applicable test case generator 740.

Whereas FIG. 7 depicts an embodiment of the present invention implemented by a sequence of function calls, an actual implementation of the method of the present invention may combine several steps and/or run several steps in parallel. The process of FIG. 7 illustrates by way of a number of discrete processes the inventive method for automatically extracting an EFSMAP from a language peculiar to one or more problem domains. Similar processes may be applied to other domain specific description languages specific to other problem domains.

Referring to FIGS. 8A-8E, there is shown a more detailed flow diagram of an exemplary embodiment of the method of the present invention. The method illustrated produces an EFSMAP from a DSL specification.

As is shown in the Figure, the method is initiated from start block 800 whereupon flow is transferred to block 805 where an ordered list of the functions contained in the DSL specification is input. This ordered list, as previously described, may be produced from the DSL specification by means of the function VariableMap. Subsequently, several variables are initialized, as shown in block 810. The index i is set to zero and is used to maintain a count of the number of models and sub-models output by the method. Similarly, the index j is initialized to zero, which is used to maintain a count of the number of transitions between states. The current model $m_{curr}$ is set to the outermost model $m_0$. The parent model is set to a known starting point, e.g., a constant "Software", since the current model is the outermost model. An index F, which is used to indicate the current function being processed, is set to the first function of the input list.

In block 815, the start state and the exit state in the current model are created and the variable $St_{curr}$, which is used to store the current state, is set to the start state of the current model.

Once the variables have been initialized, flow is transferred to block 820 in which the variable F is set to the next function in the input list and a variable $Cond_{curr}$, which is used to maintain conditional constraints as described above with reference to FIG. 3, is set to the predicate on F. The current condition is produced, as described above, from the function VariableMap. Flow is then transferred to decision block 825, in which it is determined if F is the first function of a group. If it is not the first function of a group, flow is transferred to block 865 of FIG. 8C. If, however, F is the first function of a group, flow proceeds to block 830 in which a new sub-model is created. First, the variable $m_{parent}$ is set to the current model mi and the index i is incremented. A new $m_i$ is created and a transition $t_j$ from the current state in the current model $m_{curr}$ to the new model $m_i$. A variable $St_{call}$ is set to the current state $St_{curr}$ and the current condition in the transition $t_j$ is output to the test case generator by means of the variable predicate. The index j is incremented and a variable l, which maintains a count of the number of states within a model or sub-model, is initialized to zero.

Once the new model $m_i$ has been created, the method continues at block 835 in which the variable for the current model, $m_{curr}$ is set to the new model, $m_i$. A start state and exit state is created in the new model and the current state, $St_{curr}$ is set to the start state of the new model $m_i$. Having done this, the method then determines if F is a standard library function of the DSL, or a DSL operator, as shown in decision block 840. As previously described, this operation may be performed by the Filter function. If F is not a DSL operator, flow is transferred back to block 820 and the next function of the input list is chosen. If, however, F is a DSL operator, the axioms associated therewith are embedded into the model. First, an index k, which maintains a count of the number of properties assigned to the variable X for the function F is initialized to zero, as shown in block 845. Then, in block 850, the transitions for the axioms, i.e., one transition for the axiom to be satisfied and one transition for the unsatisfied case, as described above, are created. As previously described, the set of transitions and the associated states are determined by the function TestProperty. As is shown in block 850, the axiomatic property $P_k$ for X is defined and the state $St_{j,k}$ is created in the parent model. The transition $t_{j,k}$ is directed from the current calling state to the new state $St_{j,k}$ in the parent model. The condition in the transition $t_{j,k}$ is then output by the method via the variable predicate. Then, as previously discussed, the transition $t'_{j,k}$ is created and directed from the state $St_{j,k}$ to the state $St_{Exit}$, in the parent model.

It is then determined if more properties for F on X exist, as shown in decision block 855. If it is determined that more properties do exist, the index k is incremented and the axioms are embedded in accordance with block 850. If there are no more properties for F on X, flow is transferred to block 820 where the next function in the list is selected.

Figure 8A:
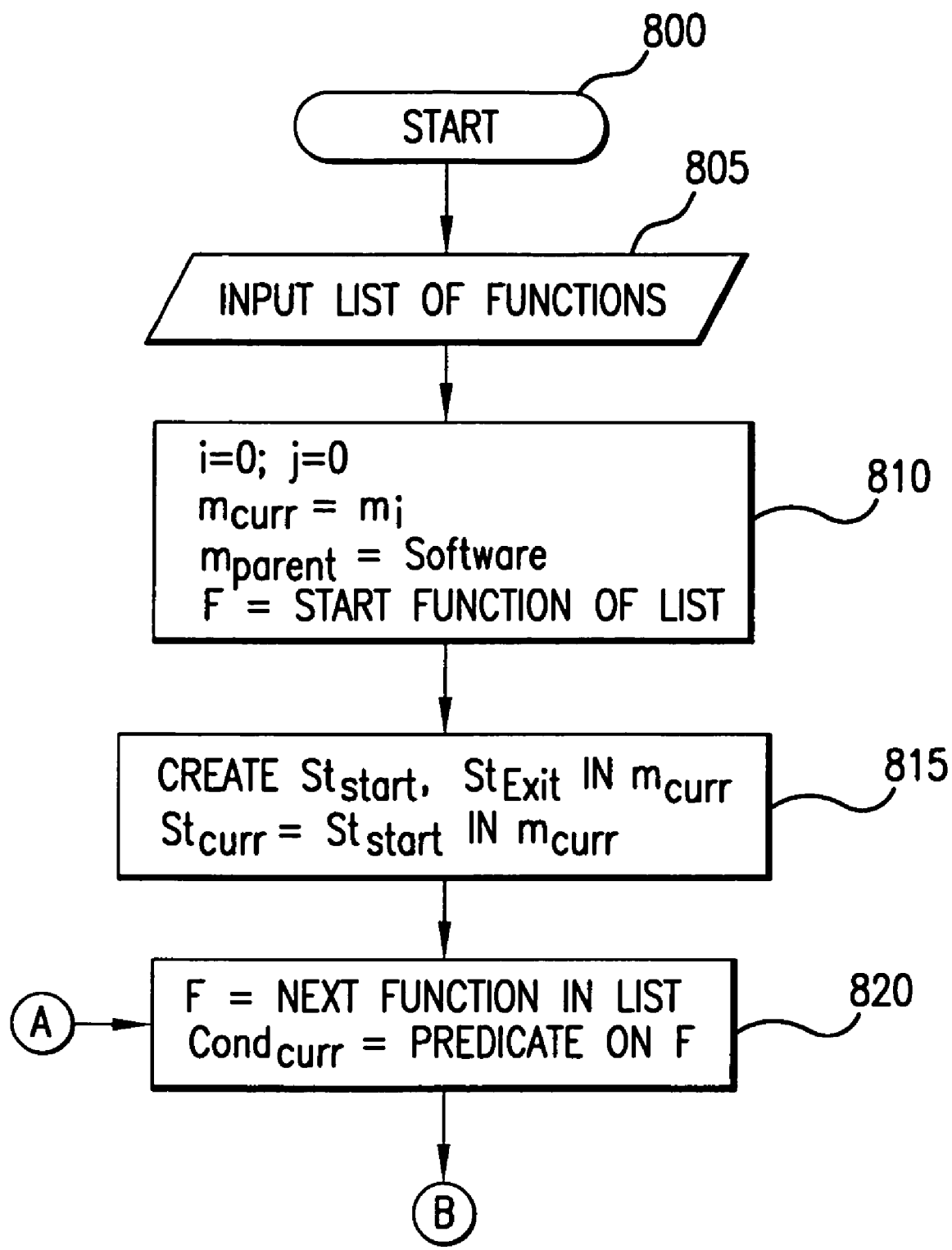
FIGS. 8A-8E is a flow diagram of a software testing embodiment of the present invention.
Figure 8B:
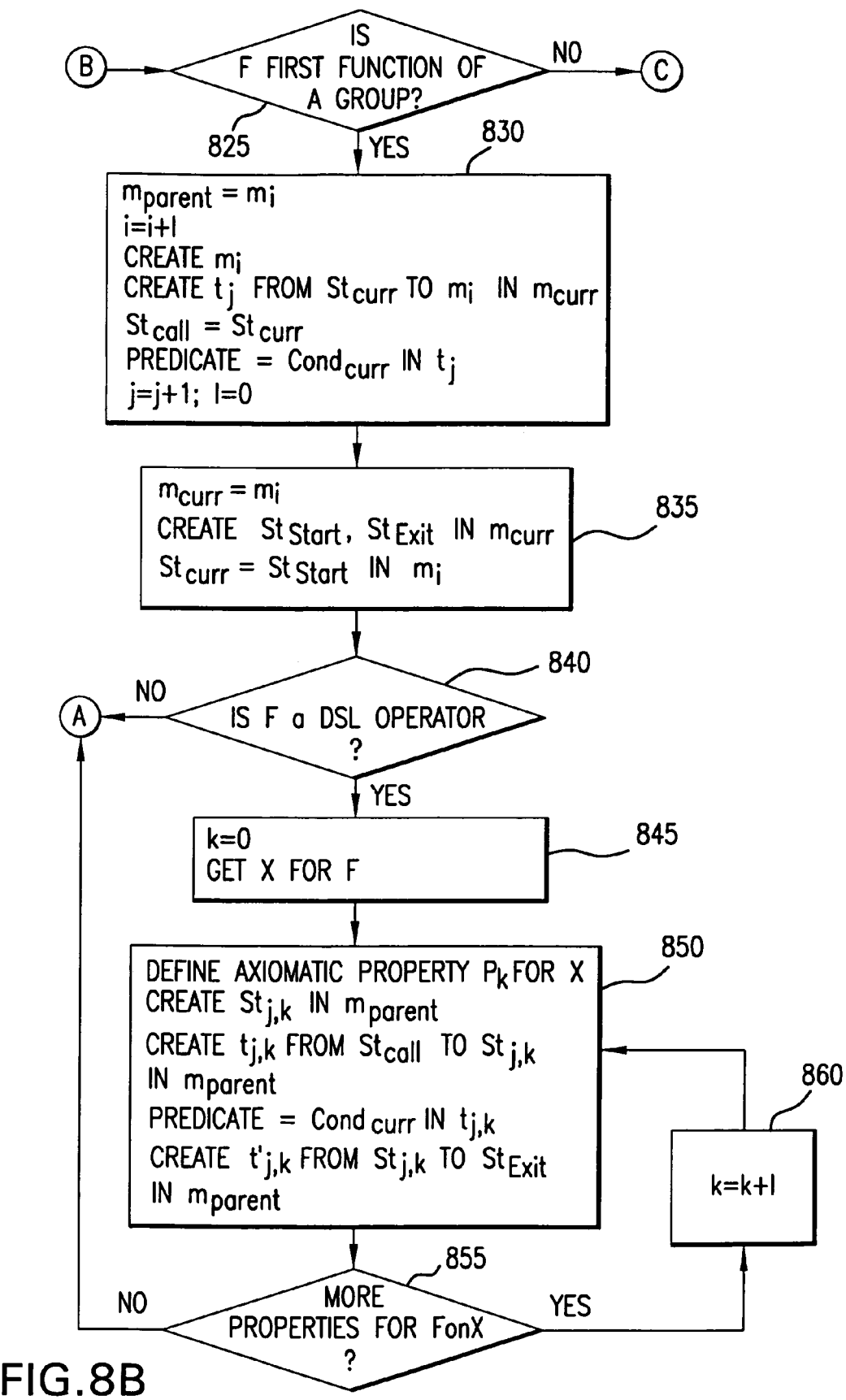
Figure 8C:
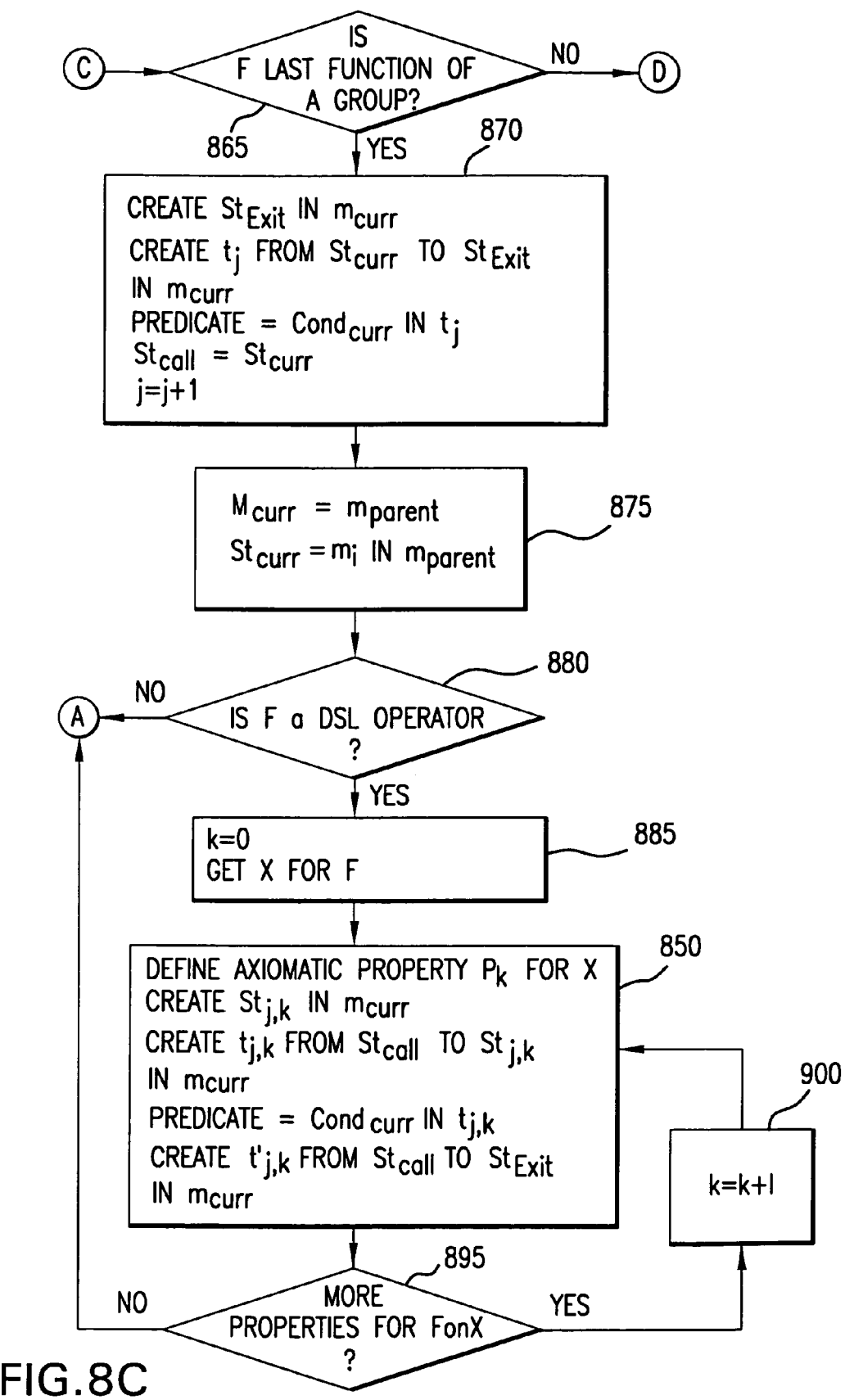
Figure 8D:
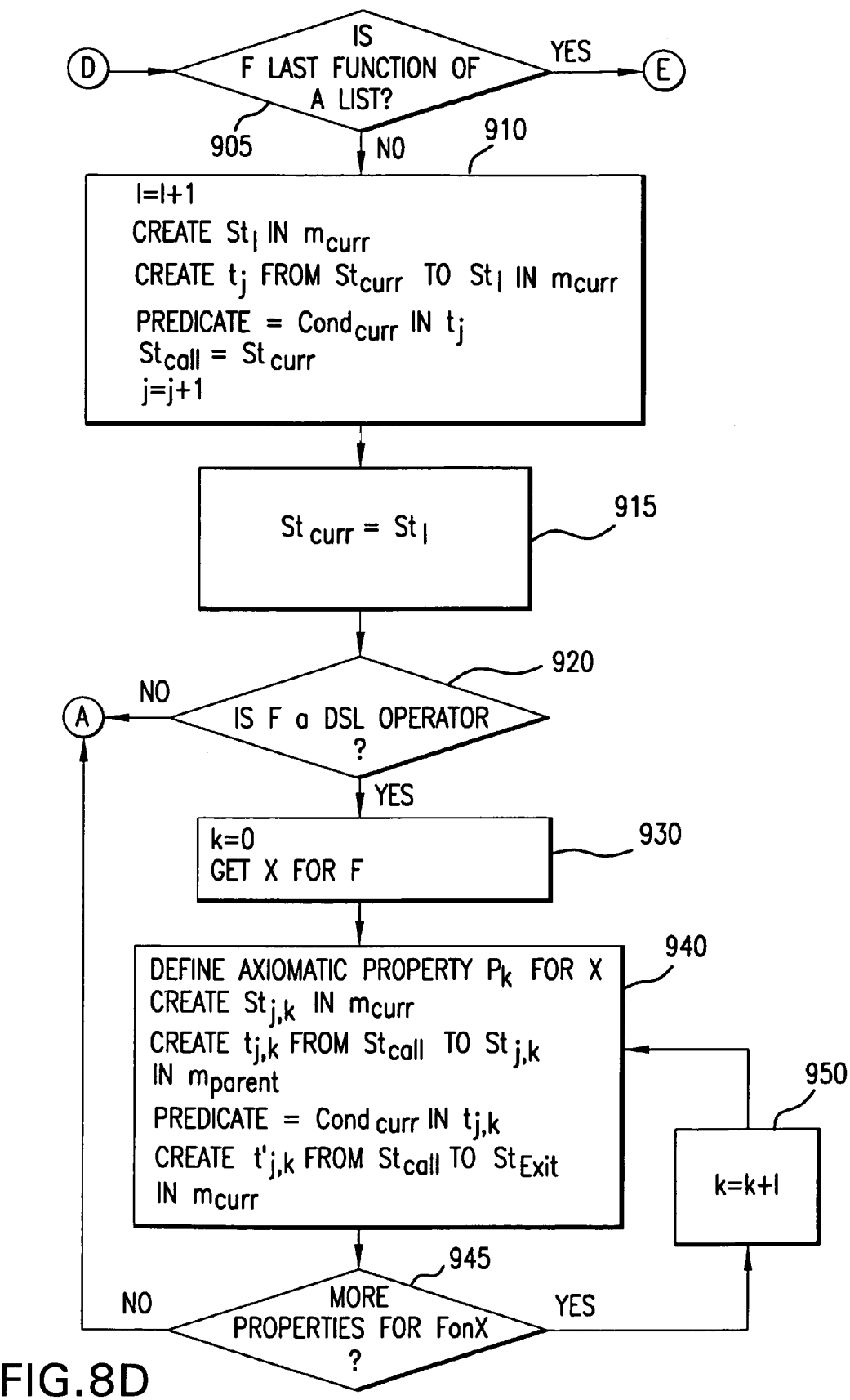

As previously stated, if F is not the first function of a group, flow is transferred to decision block 865, whereby it is determined if F is the last function of a group. If not, flow is transferred to block 905. If F is the last function of a group, the remaining steps of FIG. 8C are performed. In block 870, an exit state is created in the current model and a transition $t_j$ is directed from the current state to the exit state in the current model. The current condition in transition $t_j$ is output to the test case generator via the variable predicate. The variable $St_{call}$ is set to the current state and the index j is incremented. Then, as shown in block 875, the current model is set to be the current parent model and the current state is set to the exit end of the model $m_i$.

In decision block 880, it is determined if F is a DSL operator. If it is not, flow transfers to block 820 whereby F is set to the next function on the input list. If F is a DSL operator, the method performs the steps of block 885 through 900 to embed the axioms associated therewith. This process parallels that of blocks 845 through 860 and will not be described further here.

In decision block 905, it is determined if F is the last function of the input list. If it is, flow is transferred to block 955 of FIG. 8E. Otherwise, the method continues at block 910 where a new state is created in the current model. A transition $t_j$ from the current state to the newly-created state $St_l$ is created in the current model and the current condition in $t_j$ is output via the variable predicate. The current state is assigned to the calling state and the index j is incremented. Flow is then transferred to block 915, where the current state is set to the newly created state $St_l$. Then, in decision block 920, it is determined if F is a DSL operator. If not, a new function is retrieved from the input list at block 820. Otherwise, the method performs the steps of blocks 930 through 950 which parallel those of blocks 845 through 860 and are self-explanatory.

Figure 8E:
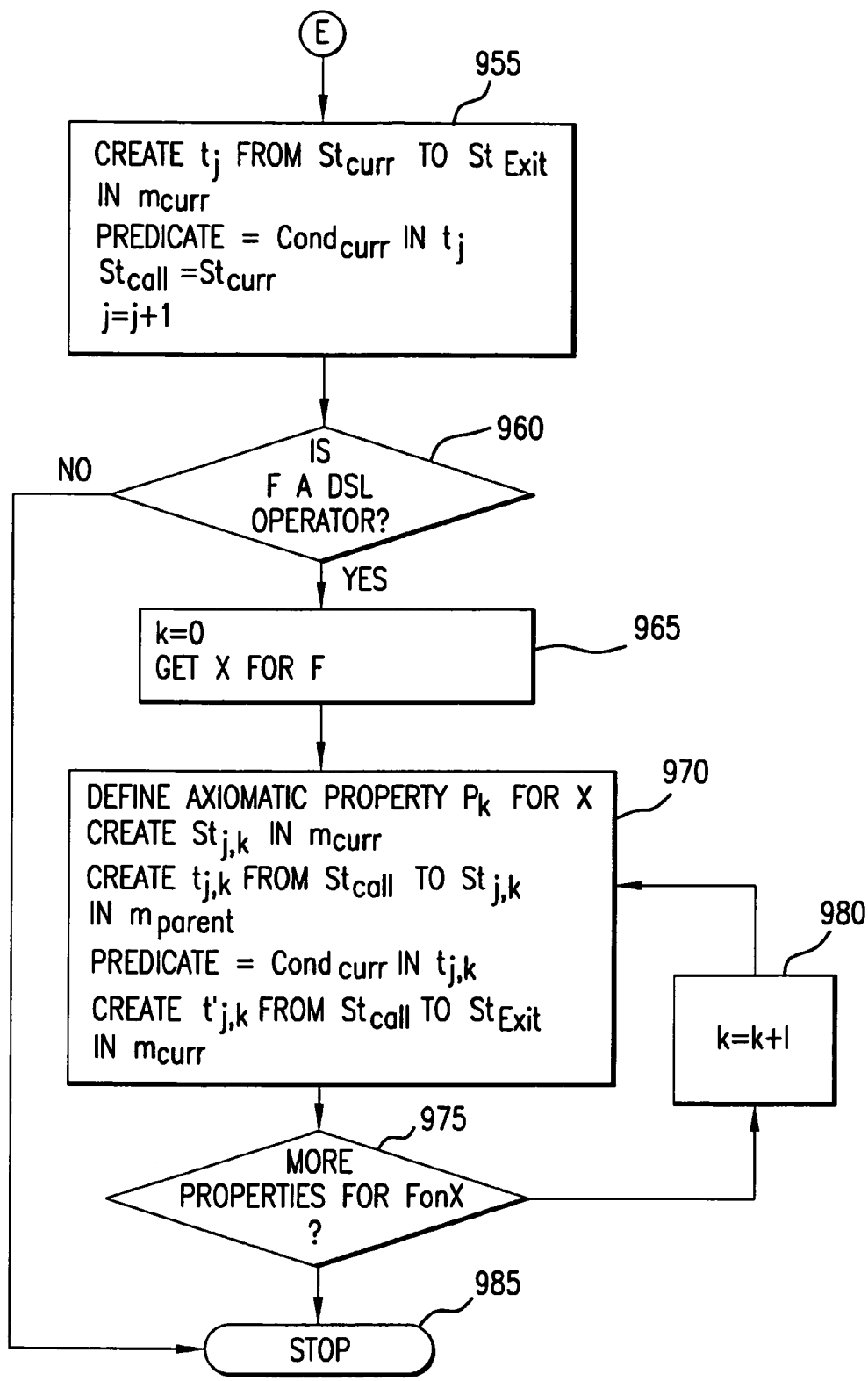

FIG. 8E depicts the steps performed when F is the last function of the input list. First, as shown in block 955, a transition from the current state to the exit state of the current model is created and the condition in the transition $t_j$ is output via the variable predicate. The calling state $St_{call}$ is set to the current state and the index j is incremented. It is then determined if F is a DSL operator via decision block 960. If not, the method terminates at block 985. If F is a DSL operator, the method performs the steps of 965 through 980 which, once again, are self-explanatory in view of the discussion of blocks 845 through 860 above.

Although the invention has been described herein in conjunction with specific embodiments thereof, many alternatives, modifications and variations will be apparent to those skilled in the art. The present invention is intended to embrace all such alternatives, modifications, and variations that fall within the spirit and broad scope of the appended claims.

What is claimed is:

1. A method for testing operation of a system against a natural language design specification defining a closed set of behaviors thereof, the system being operationally specific to at least one problem domain, the method comprising the steps of:

translating the natural language specification to a specification in at least one description language specific to a corresponding one of the at least one problem domain, each of said at least one domain specific description language including a set of axioms, each of said set of axioms corresponding to a respective syntactical relationship between morphemes of said corresponding domain specific description language;

generating a model of the system from said domain specific description language specification, said model behaving in accordance with a first set of behaviors and a second set of behaviors, each of said first set of behaviors corresponding to a respective one of the closed set of behaviors and each of said second set of behaviors corresponding to a respective one of said set of axioms;

generating from said model a test case for each behavior of a set union of said first set of behaviors and said second set of behaviors; and providing to the system every test case generated from said model as the set of test cases for testing the system operation.

2. The method for testing operation of a system by providing a set of test cases thereto as recited in claim 1, whereby said model includes an extended finite state machine.

3. The method for testing operation of a system by providing a set of test cases thereto as recited in claim 2, whereby at least one state transition corresponding each of said axioms is embedded into said extended finite state machine.

4. The method for testing operation of a system by providing a set of test cases thereto as recited in claim 1, whereby each of said at least one domain specific description language is a respective domain specific computer programming language.

5. The method for testing operation of a system by providing a set of test cases thereto as recited in claim 4, whereby each of said domain specific programming language is a respective functional language.

6. The method for testing operation of a system by providing a set of test cases thereto as recited in claim 5, whereby said model generating step includes the steps of:

reordering functions in said domain specific programming language specification;

separating said functions into a first set of functions corresponding to functions native to said domain specific programming language and a second set of functions corresponding to functions foreign to said domain programming specific language;

generating an extended finite state machine from said second set of functions; and embedding into said extended finite state machine at least one state transition corresponding to each of said first set of functions.

7. The method for testing operation of a system by providing a set of test cases thereto as recited in claim 6, whereby said functions are reordered in a temporal order of execution.

8. The method for testing operation of a system by providing a set of test cases thereto as recited in claim 6, whereby said first set of functions includes recursion.

9. The method for testing operation of a system by providing a set of test cases thereto as recited in claim 8, whereby a state transition is embedded into said extended finite state machine for each of a base case, a terminating case and one recursive step of said recursion function.

10. A method for testing a computing application specific to a computing domain comprising the steps of:

providing to a testing authority a natural language specification of the computing application defining a closed set of behaviors thereof;

translating said natural language specification into a specification in at least one computing language specific to the computing domain;

generating a model of the application from said at least one domain specific language specification, said model behaving in accordance with a set union of behaviors corresponding to at least one set of axioms derived from said at least one domain specific language and said closed set of behaviors;

generating a set of test cases executable by the computing application from said model, each of said set of test cases corresponding to one of said set union of behaviors;

executing each of said set of test cases by means of the computing application; and communicating to said testing authority each of said set of test cases which results in a behavior of the application contrary to said corresponding one of said closed set of behaviors specified in said natural language specification.

11. The method for testing a computing application as recited in claim 10, whereby each of said at least one domain specific language is a functional language.

12. The method for testing a computing application as recited in claim 10, whereby all of said at least one domain specific language are derived from a common functional language.

13. The method for testing a computing application as recited in claim 12, whereby said common functional language is Haskell.

14. The method for testing a computing application as recited in claim 13, whereby one of said at least one domain specific language is HaskellDB.

15. The method for testing a computing application as recited in claim 14, whereby one of said at least one domain specific language is TclHaskell.

16. The method for testing a computing application as recited in claim 13, whereby one of said at least one domain specific language is TclHaskell.

17. The method for testing a computing application as recited in claim 10, whereby said behavioral model includes an extended finite state machine defined by said closed set of behaviors.

18. The method for testing a computing application as recited in claim 17, whereby said extended finite state machine is embedded with state transitions corresponding to each of said at least one set of axioms.

19. The method for testing a computing application as recited in claim 11, whereby said model generating step further includes the steps of:

reordering functions in said domain specific language specification;

separating said functions into a first set of functions corresponding to functions native to said domain specific language and a second set of functions corresponding to functions foreign to said domain specific language;

generating an extended finite state machine from said second set of functions; and embedding into said extended finite state machine at least one state transition corresponding to each of said first set of functions.

20. The method for testing a computing application as recited in claim 19, whereby said functions are reordered in a temporal order of execution.

21. The method for testing a computing application as recited in claim 19, whereby said first set of functions includes recursion.

22. The method for testing a computing application as recited in claim 21, whereby a state transition is embedded into said extended finite state machine for each of a base case, a terminating case and one recursive step of said recursion function.

* * * * *